(12) United States Patent
Thaimattam et al.

(10) Patent No.: US 12,486,286 B2
(45) Date of Patent: Dec. 2, 2025

(54) PROCESS AND POLYMORPHIC FORMS OF BICTEGRAVIR AND ITS PHARMACEUTICALLY ACCEPTABLE SALTS OR CO-CRYSTALS THEREOF

(71) Applicant: LAURUS LABS LIMITED, Hyderabad (IN)

(72) Inventors: Ram Thaimattam, Hyderabad (IN); Sureshbabu Radhakrishnan, Hyderabad (IN); Pavan Kumar Seethamraju, Hyderabad, IN (US); Satheesh Beeravalli, Hyderabad (IN); Uma Maheswara Rao Pampana, Hyderabad (IN); Anil Kumar Reddy Shamakura, Hyderabad (IN); Ravindra Babu Bollu, Hyderabad (IN); Uma Maheswer Rao Vasireddi, Hyderabad (IN)

(73) Assignee: LAURUS LABS LIMITED, Hyderabad (IN)

( * ) Notice: Subject to any disclaimer, the term of this patent is extended or adjusted under 35 U.S.C. 154(b) by 957 days.

(21) Appl. No.: 17/629,985

(22) PCT Filed: Jun. 18, 2020

(86) PCT No.: PCT/IB2020/055690
§ 371 (c)(1),
(2) Date: Jan. 25, 2022

(87) PCT Pub. No.: WO2020/255004
PCT Pub. Date: Dec. 24, 2020

(65) Prior Publication Data
US 2022/0306650 A1 Sep. 29, 2022

(30) Foreign Application Priority Data

Jun. 18, 2019 (IN) .............................. 2019 41024196
Nov. 5, 2019 (IN) .............................. 2019 41044872
Jun. 17, 2020 (IN) .............................. 2020 41025395

(51) Int. Cl.
C07D 498/18 (2006.01)

(52) U.S. Cl.
CPC ........ *C07D 498/18* (2013.01); *C07B 2200/13* (2013.01)

(58) Field of Classification Search
None
See application file for complete search history.

(56) References Cited

FOREIGN PATENT DOCUMENTS

| WO | WO 2015139591 A1 | 9/2015 |
| WO | WO 2015196116 A1 | 12/2015 |
| WO | WO 2018229798 A1 | 12/2018 |

*Primary Examiner* — Sarah Pihonak
*Assistant Examiner* — Donna M Nestor
(74) *Attorney, Agent, or Firm* — Blank Rome LLP

(57) ABSTRACT

The present invention generally relates to polymorphic forms of bictegravir, its salts, co-crystals, solvates or hydrates thereof and process for the preparation of the same and also relates to pharmaceutical compositions containing the same. The present invention also relates to a process for preparation of bictegravir substantially free from its diastereomer impurity.

27 Claims, 14 Drawing Sheets

PROCESS AND POLYMORPHIC FORMS OF BICTEGRAVIR AND ITS PHARMACEUTICALLY ACCEPTABLE SALTS OR CO-CRYSTALS THEREOF

CROSS-REFERENCE TO RELATED APPLICATIONS

This is a national stage application that claims the benefit of the filing date and disclose of International Application PCT/IB2020/055690, filed on Jun. 18, 2020, which is related to and claims the benefit of the filing dates and disclosures under Indian Provisional Application Nos. 201941024196 filed on Jun. 18, 2019, entitled "Polymorphs of bictegravir, its salts, co-crystals, solvates or hydrates thereof and process for the preparation of the same"; 201941044872 filed on Nov. 5, 2019, entitled "Polymorphic form of bictegravir sodium and process for the preparation of the same", and 202041025395 filed on Jun. 17, 2020, entitled "Process and polymorphic forms of bictegravir and its pharmaceutically acceptable salts or co-crystals thereof," the contents of each of which are incorporated by reference herein.

FIELD OF THE INVENTION

The present invention relates to novel crystalline polymorphic forms of bictegravir, its pharmaceutically acceptable salts, co-crystals, solvates or hydrates thereof and its processes for preparation thereof and pharmaceutical compositions containing the same.

The present invention also relates to a process for preparation of bictegravir substantially free from its diastereomer impurity.

BACKGROUND OF THE INVENTION

Bictegravir is a class of polycyclic carbamoyl pyridone compounds and is chemically known as 2,5-Methanopyrido [1',2':4,5]pyrazino[2,1-b] [1,3]oxazepine-10-carboxamide, 2,3,4,5,7,9,13,13a-octahydro-8-hydroxy-7,9-dioxo-N-[(2,4, 6-trifluoro phenyl)methyl]-(2R,5S,13aR), and is approved as its sodium salt, it has the following structure:

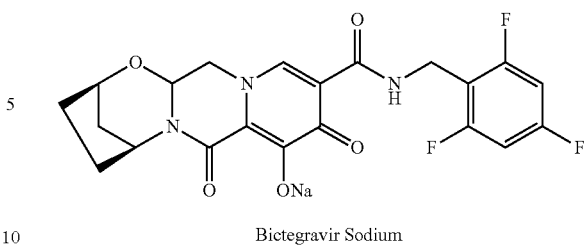

Bictegravir Sodium

Bictegravir (BIC) is marketed in combination with emtricitabine (FTC) and tenofovir alafenamide fumarate (TAF) by Gilead under the trade name BIKTARVY® as oral tablet in US and EP for the treatment of human immunodeficiency virus type 1 (HIV-1) infection in adults. Each BIKTARVY® tablet contains 50 mg of BIC (equivalent to 52.5 mg of bictegravir sodium), 200 mg of FTC, and 25 mg of TAF (equivalent to 28 mg of tenofovir alafenamide fumarate).

PCT application Number: 2014/100323 ("the '323 publication") disclosed different polycyclic carbamoyl pyridone compounds, including bictegravir and processes for the preparation thereof. The '323 publication discloses process for the preparation of bictegravir, which involves bictegravir was isolated by silica gel column chromatography using ethanol/methylene chloride as an eluents, followed by purification by High Performance Liquid Chromatography (HPLC) using acetonitrile and water with 0.1% trifluoro acetic acid as an eluent. The '323 publication discloses only preparation of bictegravir and fails to disclose any polymorphic information on resulted bictegravir. The '323 publication disclosed process for preparation of bictegravir is as follows:

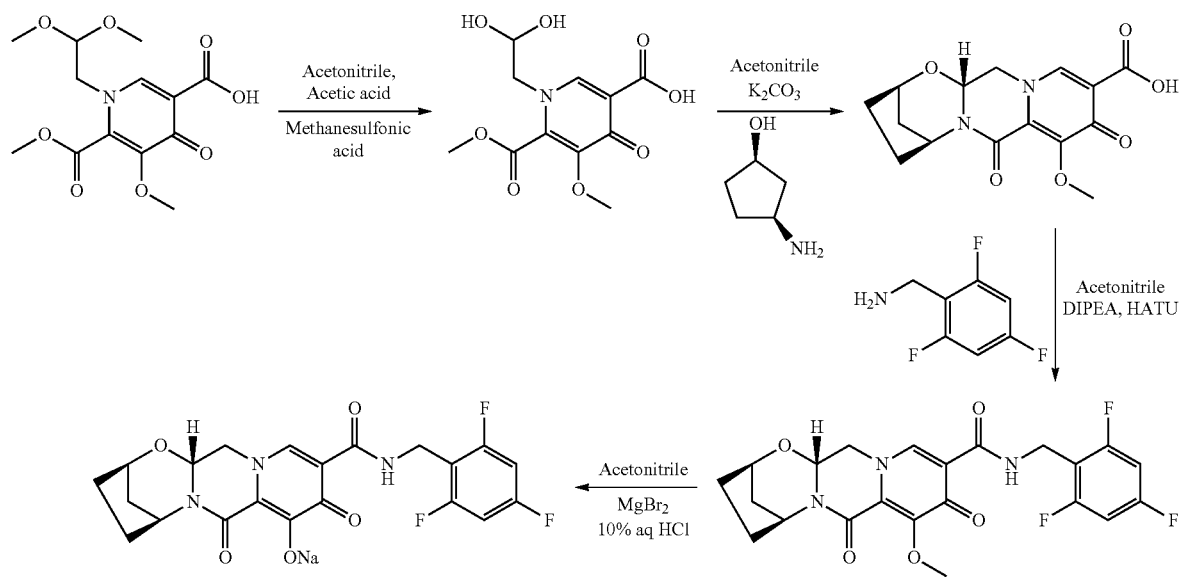

The '323 publication disclosed process involves acid-amine coupling step in presence of highly costly coupling agent HATU. HATU coupling reactions involves formation of high amount of byproducts such as 1,1,3,3-tertamethylurea (TMU) and 1-Hydroxy-7-azabenzotriazole (HOAt), which are very difficult to separate from product without using silica gel column chromatography.

PCT application Number: 2015/195656 ("the '656 publication") discloses an alternative tricyclic cyclization process for preparation of bictegravir. The '656 publication disclosed process for preparation of bictegravir is as follows:

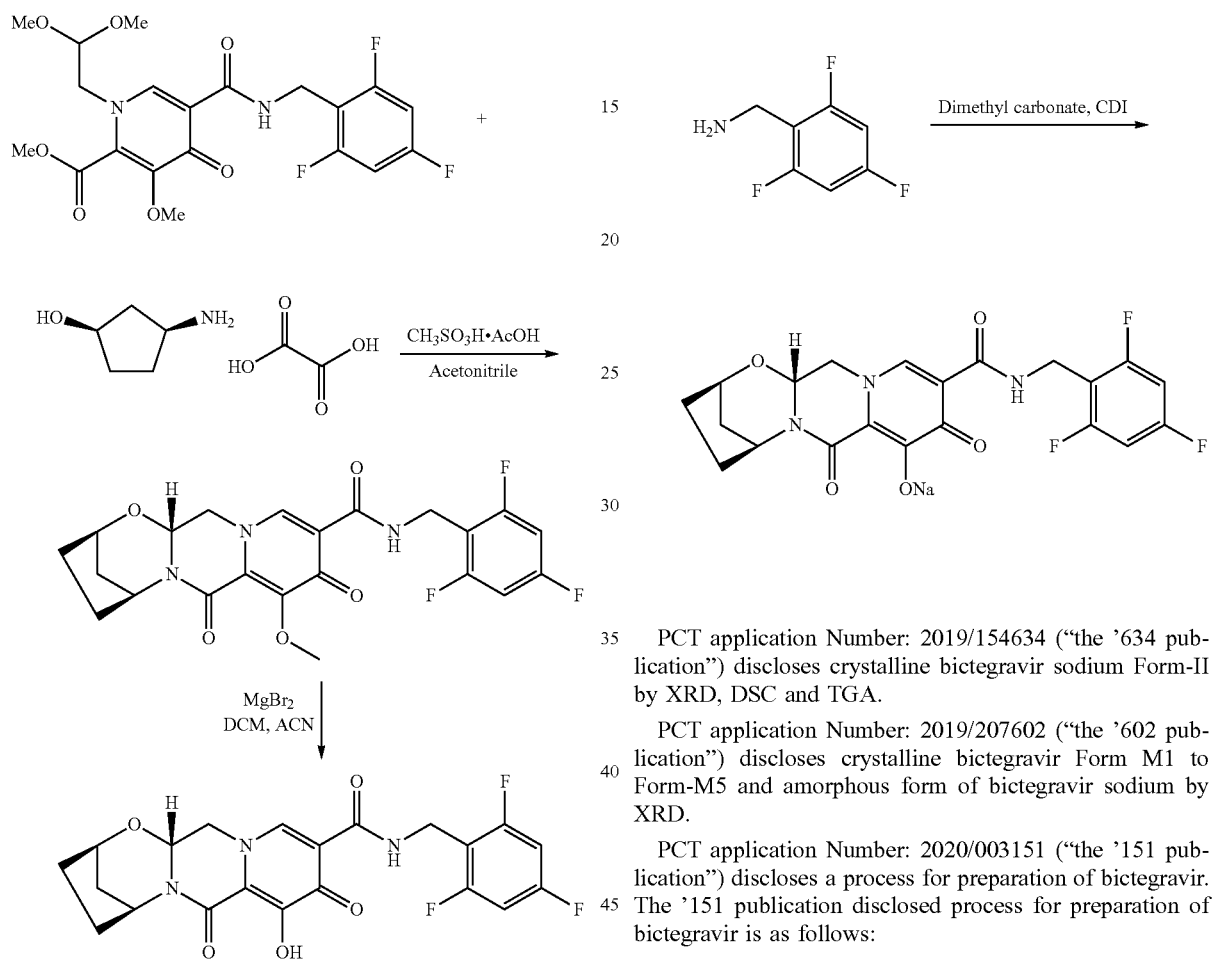

PCT application Number: 2015/196116 ("the '116 publication") discloses bictegravir sodium salt, and its process for preparation thereof from ethanol and aqueous sodium hydroxide. This publication further discloses characterization of resulted polymorph, which is designated as crystalline Form-I by XRD, DSC and TGA.

PCT application Number: 2015/196137 ("the '137 publication") discloses crystalline forms of bictegravir such as Form-I, II, III, IV, V, VI, VII and Form-VIII. Further, the '137 publication discloses co-crystals of bictegravir with fumaric acid, citric acid, oxalic acid & bictegravir crystalline potassium salt Form I, II, III.

PCT application Number: 2018/229798 ("the '798 publication") discloses a process for preparation of bictegravir by coupling of free hydroxy compound with benzylamine. The '798 publication disclosed process for preparation of bictegravir is as follows:

PCT application Number: 2019/154634 ("the '634 publication") discloses crystalline bictegravir sodium Form-II by XRD, DSC and TGA.

PCT application Number: 2019/207602 ("the '602 publication") discloses crystalline bictegravir Form M1 to Form-M5 and amorphous form of bictegravir sodium by XRD.

PCT application Number: 2020/003151 ("the '151 publication") discloses a process for preparation of bictegravir. The '151 publication disclosed process for preparation of bictegravir is as follows:

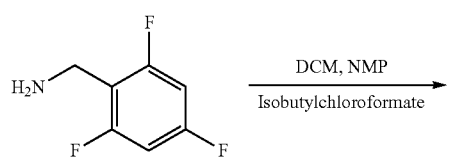

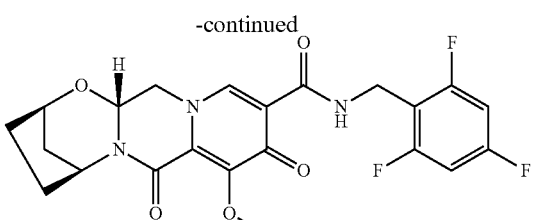

ACN, LiBr
NaOH

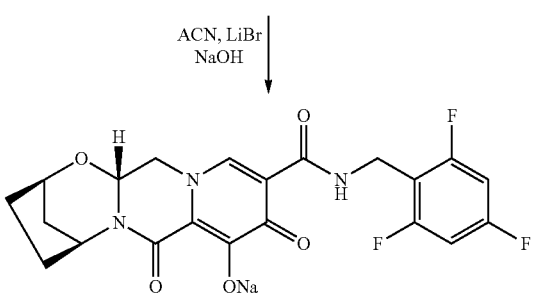

PCT application Number: 2020/003151("the '151 publication") discloses crystalline bictegravir sodium Form-HN1 by XRD and DSC.

The '151 publication disclosed process involves preparation of bictegravir by activation of acid group using Isobutyl chloroformate. Generally, amide coupling reactions in presence of Isobutyl chloroformate involve racemization of isomers and results formation of diastereomer impurity. Hence, the use of Isobutyl chloroformate as a coupling agent is not preferable in large scale manufacturing.

Further, all the reported acid-amide coupling processes involves formation of diastereomer impurity and due to less polarity differences this impurity is very difficult to separate from the required product by crystallization and column purification.

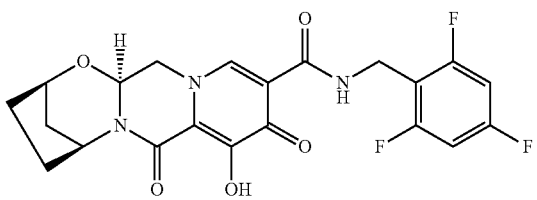

Diasteromer impurity

Bictegravir sodium is one of the important drug available in the market for the treatment of HIV infection. Hence, it's important to develop a simple and cost effective process for preparation of bictegravir to obviate the aforementioned problems, which is readily amenable to large scale production and free from its diastereomer impurity.

Further, it is also important to discover new polymorphic forms of bictegravir and its pharmaceutically acceptable salts or co-crystals thereof, which may provide a new opportunity to improve the performance characteristics of a pharmaceutical product. The discovery of new crystalline polymorphic forms and solvates of a pharmaceutically useful compound, like bictegravir or its pharmaceutically acceptable salts or co-crystals thereof, may provide a new opportunity to improve the performance characteristics of a pharmaceutical product. It also adds to the material that a formulation scientist has available for designing, for example, a pharmaceutical dosage form of a drug with a targeted release profile or other desired characteristic.

Hence the main object of the present invention is to provide improved process for preparation of bictegravir to obviate the aforementioned problems and polymorphic forms of bictegravir and its pharmaceutically acceptable salts or co-crystals thereof.

SUMMARY OF THE INVENTION

The present invention encompasses improved process for preparation of bictegravir. The present invention also involves novel crystalline polymorphic forms of bictegravir, its salts, co-crystals, solvates or hydrates thereof, process for their preparation and pharmaceutical composition comprising one or more of the novel polymorphic forms of bictegravir, its salts, co-crystals, solvates or hydrates thereof.

In accordance with one embodiment, the present invention provides novel crystalline polymorphic forms of bictegravir sodium; which are designated herein as bictegravir sodium Form-L, bictegravir sodium Form-L1, bictegravir sodium Form-L2, bictegravir sodium Form-L3, bictegravir sodium Form-L4, bictegravir sodium Form-L5 and bictegravir sodium Form-L6.

In accordance with another embodiment, the present invention provides novel crystalline polymorphic form of bictegravir sodium Form-L.

In accordance with another embodiment, the present invention provides bictegravir sodium Form-L characterized by a powder X-ray diffraction (PXRD) pattern substantially in accordance with FIG. 1.

In accordance with another embodiment, the present invention provides bictegravir sodium Form-L characterized by X-Ray diffraction (XRD) pattern having one or more peaks at about 6.5, 9.1, 11.1, 11.3, 12.1, 12.9, 13.1, 14.0, 15.2, 15.6, 15.9, 16.5, 16.8, 17.2, 18.2, 18.8, 19.4, 19.9, 20.5, 21.1, 21.7, 22.6, 23.2, 24.3, 24.9, 25.6, 25.7, 26.5, 26.8, 27.4, 28.4, 29.6, 30.8, 31.4, 32.8, 34.5 and 35.1±0.2° 2θ.

In accordance with another embodiment, the present invention provides a process for preparation of bictegravir sodium Form-L, comprising:
a) suspending or dissolving bictegravir in methylene chloride or trifluoroethanol at 25° C. to reflux temperature,
b) optionally cooling the step a) reaction mass to below 25° C.,
c) adding sodium source to step a) or step b) reaction mass or vice-versa, and
d) isolating bictegravir sodium Form-L.

In accordance with another embodiment, the present invention provides crystalline polymorphic form of bictegravir sodium Form-L1.

In accordance with another embodiment, the crystalline polymorphic form of bictegravir sodium Form-L1 of the present invention is Isopentanol solvate.

In accordance with another embodiment, the present invention provides bictegravir sodium Form-L1 characterized by a powder X-ray diffraction (PXRD) pattern substantially in accordance with FIG. 2.

In accordance with another embodiment, the present invention provides bictegravir sodium Form-L1 characterized by X-Ray diffraction (XRD) pattern having one or more peaks at about 5.6, 6.2, 7.7, 9.1, 11.3, 11.9, 12.6, 12.8, 13.9, 15.4, 16.2, 16.8, 17.0, 17.6, 18.4, 18.8, 18.9, 19.2, 19.8, 20.5, 20.7, 21.0, 21.5, 22.8, 23.8, 24.2, 24.5, 25.3, 25.7, 27.1, 28.4, 28.8, 29.5, 30.0, 30.9, 31.3, 31.8, 32.9, 33.4, 34.0, and 34.9±0.2° 2θ.

In accordance with another embodiment, the present invention provides a process for preparation of bictegravir sodium Form-L1, comprising:
a) suspending or dissolving bictegravir in a mixture of isopentanol and acetonitrile at 25° C. to reflux temperature,
b) optionally cooling the step a) reaction mass to below 25° C.,
c) adding sodium source to step a) or step b) reaction mass or vice-versa, and
d) isolating bictegravir sodium Form-L1.

In accordance with another embodiment, the present invention provides crystalline polymorphic form of bictegravir sodium Form-L2.

In accordance with another embodiment, the present invention provides bictegravir sodium Form-L2 characterized by a powder X-ray diffraction (PXRD) pattern substantially in accordance with FIG. 3.

In accordance with another embodiment, the present invention provides bictegravir sodium Form-L2 characterized by X-Ray diffraction (XRD) pattern having one or more peaks at about 6.5, 7.5, 8.3, 13.0, 14.4, 14.5, 15.4, 16.2, 16.7, 18.0, 18.6, 18.7, 19.4, 20.8, 20.9, 23.4, 24.0, 24.6, 26.3, 29.4, 30.0, 31.4, 32.8 and 35.3±0.2° 2θ.

In accordance with another embodiment, the present invention provides a process for preparation of bictegravir sodium Form-L2, the process comprising:
a) suspending or dissolving bictegravir in a mixture of isopentanol and acetonitrile at 25° C. to reflux temperature,
b) optionally cooling the step a) reaction mass to below 25° C.,
c) adding sodium source to step a) or step b) reaction mass or vice-versa,
d) isolating the wet solid, and
e) drying the solid at a temperature of about 35° C. to about 120° C. to obtain bictegravir sodium Form-L2.

In accordance with another embodiment, the present invention provides a process for preparation of bictegravir sodium Form-L2, the process comprising: subjecting to heating bictegravir sodium Form-L1 at a temperature of about 35° C. to about 120° C., wherein the bictegravir sodium Form-L1 characterized by an XRPD pattern substantially in accordance with FIG. 2.

In accordance with another embodiment, the present invention provides crystalline polymorphic form of bictegravir sodium Form-L3.

In accordance with another embodiment, the crystalline polymorphic form of bictegravir sodium Form-L3 of the present invention is n-butanol solvate.

In accordance with another embodiment, the present invention provides bictegravir sodium Form-L3 characterized by a powder X-ray diffraction (PXRD) pattern substantially in accordance with FIG. 4.

In accordance with another embodiment, the present invention provides bictegravir sodium Form-L3 characterized by X-Ray diffraction (XRD) pattern having one or more peaks at about 5.9, 6.8, 8.5, 10.7, 11.7, 12.4, 13.2, 13.7, 15.4, 15.9, 16.6, 17.0, 17.5, 18.8, 19.6, 20.2, 20.6, 21.1, 21.5, 22.1, 22.9, 23.3, 24.1, 24.8, 25.6, 26.4, 28.6, 29.8, 30.7, 31.4, 32.9 and 34.1±0.2° 2θ.

In accordance with another embodiment, the present invention provides a process for preparation of bictegravir sodium Form-L3, comprising:
a) suspending or dissolving bictegravir in n-butanol at 25° C. to reflux temperature,
b) optionally cooling the step a) reaction mass to below 25° C.,
c) adding sodium source to step a) or step b) reaction mass or vice-versa, and
d) isolating bictegravir sodium Form-L3.

In accordance with another embodiment, the present invention provides crystalline polymorphic form of bictegravir sodium Form-L4.

In accordance with another embodiment, the crystalline polymorphic form of bictegravir sodium Form-L4 of the present invention is n-pentanol solvate.

In accordance with another embodiment, the present invention provides bictegravir sodium Form-L4 characterized by a powder X-ray diffraction (PXRD) pattern substantially in accordance with FIG. 5.

In accordance with another embodiment, the present invention provides bictegravir sodium Form-L4 characterized by X-Ray diffraction (XRD) pattern having one or more peaks at about 5.6, 6.8, 8.4, 10.5, 11.3, 12.4, 12.9, 13.6, 15.0, 15.4, 16.6, 17.3, 18.1, 18.8, 19.5, 19.9, 20.5, 20.8, 21.3, 21.7, 22.6, 23.7, 24.0, 24.7, 25.0, 25.6, 25.8, 27.3, 28.0, 29.8, 30.5, 31.3, 32.4, 33.0, 34.2 and 35.0±0.2° 2θ.

In accordance with another embodiment, the present invention provides a process for preparation of bictegravir sodium Form-L4, comprising:
a) suspending or dissolving bictegravir in n-pentanol at 25° C. to reflux temperature,
b) optionally cooling the step a) reaction mass to below 25° C.,
c) adding sodium source to step a) or step b) reaction mass or vice-versa, and
d) isolating bictegravir sodium Form-L4.

In accordance with another embodiment, the present invention provides crystalline polymorphic form of bictegravir sodium Form-L5.

In accordance with another embodiment, the crystalline polymorphic form of bictegravir sodium Form-L5 of the present invention is n-propanol solvate.

In accordance with another embodiment, the present invention provides bictegravir sodium Form-L5 characterized by a powder X-ray diffraction (PXRD) pattern substantially in accordance with FIG. 6.

In accordance with another embodiment, the present invention provides bictegravir sodium Form-L5 characterized by X-Ray diffraction (XRD) pattern having one or more peaks at about 5.6, 6.4, 7.4, 8.4, 9.5, 10.2, 12.0, 12.9, 13.9, 14.4, 15.3, 16.1, 16.7, 18.0, 18.7, 19.4, 19.9, 20.7, 22.0, 22.4, 23.3, 24.0, 24.6, 25.7, 26.3, 28.5, 29.4, 29.9, 31.3, 31.8 and 32.6±0.2° 2θ.

In accordance with another embodiment, the present invention provides a process for preparation of bictegravir sodium Form-L5, comprising:
a) suspending or dissolving bictegravir in n-propanol at 25° C. to reflux temperature,
b) optionally cooling the step a) reaction mass to below 25° C.,
c) adding sodium source to step a) or step b) reaction mass or vice-versa, and
d) isolating bictegravir sodium Form-L5.

In accordance with another embodiment, the present invention provides crystalline polymorphic form of bictegravir sodium Form-L6.

In accordance with another embodiment, the crystalline polymorphic form of bictegravir sodium Form-L6 of the present invention is isobutanol solvate.

In accordance with another embodiment, the present invention provides bictegravir sodium Form-L6 characterized by a powder X-ray diffraction (PXRD) pattern substantially in accordance with FIG. 7.

In accordance with another embodiment, the present invention provides bictegravir sodium Form-L6 characterized by X-Ray diffraction (XRD) pattern having one or more peaks at about 5.6, 6.5, 7.5, 8.3, 9.6, 10.3, 12.0, 12.9, 14.0, 14.5, 15.3, 16.2, 16.7, 17.7, 18.0, 18.7, 19.4, 19.9, 20.8, 20.9, 22.5, 23.4, 24.0, 24.6, 26.3, 27.0, 29.4, 30.0, 31.3, 32.8 and 34.5±0.2° 2θ.

In accordance with another embodiment, the present invention provides a process for preparation of bictegravir sodium Form-L6, comprising:
a) suspending or dissolving bictegravir in isobutanol at 25° C. to reflux temperature,
b) optionally cooling the step a) reaction mass to below 25° C.,
c) adding sodium source to step a) or step b) reaction mass or vice-versa, and
d) isolating bictegravir sodium Form-L6.

In accordance with another embodiment, the present invention provides novel salt or co-crystal of bictegravir, wherein the salt or co-crystal of bictegravir is bictegravir diethylamine, bictegravir tromethamine, bictegravir magnesium, bictegravir zinc and bictegravir calcium.

In accordance with another embodiment, the present invention provides bictegravir diethylamine.

In accordance with another embodiment, the present invention provides a process for the preparation of bictegravir diethylamine, comprising:
a) providing a solution of bictegravir and diethylamine in a suitable organic solvent or a mixture thereof at ambient to reflux temperature,
b) cooling the solution to below 30° C.; and
c) isolating bictegravir diethylamine.

In accordance with another embodiment, the present invention provides bictegravir diethylamine is either amorphous or crystalline in nature.

In accordance with another embodiment, the present invention provides bictegravir diethylamine characterized by a powder X-ray diffraction (PXRD) pattern substantially in accordance with FIG. 8.

In accordance with another embodiment, the present invention provides bictegravir diethylamine characterized by X-Ray diffraction (XRD) pattern having one or more peaks at about 5.5, 6.9, 8.6, 8.9, 9.4, 10.1, 10.2, 10.5, 11.1, 11.5, 11.6, 11.9, 12.4, 12.9, 13.1, 13.9, 14.2, 14.6, 14.8, 15.1, 15.8, 16.3, 16.7, 16.9, 17.3, 17.9, 18.4, 18.8, 19.0, 19.2, 19.6, 19.8, 20.0, 20.4, 20.6, 21.1, 21.6, 21.9, 22.1, 22.6, 23.0, 23.3, 23.5, 23.9, 24.1, 24.3, 25.0, 25.4, 26.2, 26.5, 27.2, 27.8, 28.1, 28.4, 29.5, 29.9, 30.2, 30.8, 31.1, 31.6, 32.1, 32.3, 33.0, 33.9, 34.4 and 35.1±0.2° 2θ.

In accordance with another embodiment, the present invention provides bictegravir tromethamine.

In accordance with another embodiment, the present invention provides a process for the preparation of bictegravir tromethamine, comprising:
a) providing a solution of bictegravir and tromethamine in a suitable organic solvent or a mixture thereof at ambient to reflux temperature,
b) cooling the solution to below 30° C.; and
c) isolating bictegravir tromethamine.

In accordance with another embodiment, the present invention provides bictegravir tromethamine is either amorphous or crystalline in nature.

In accordance with another embodiment, the present invention provides bictegravir tromethamine characterized by a powder X-ray diffraction (PXRD) pattern substantially in accordance with FIG. 9.

In accordance with another embodiment, the present invention provides bictegravir tromethamine characterized by X-Ray diffraction (XRD) pattern having one or more peaks at about 8.9, 9.6, 10.3, 11.6, 12.0, 12.2, 13.1, 13.9, 14.3, 14.9, 15.0, 15.5, 15.7, 16.1, 16.2, 17.2, 17.3, 17.7, 17.8, 18.2, 18.6, 18.9, 19.3, 19.9, 20.2, 20.7, 21.4, 22.0, 22.6, 22.8, 23.2, 24.0, 24.2, 25.0, 25.3, 25.9, 26.7, 27.1, 27.6, 28.0, 28.6, 29.1, 29.7, 30.1, 30.4, 31.3, 31.2, 32.6, 33.2, 33.5, 34.0, 34.4 and 35.8±0.2° 2θ.

In accordance with another embodiment, the present invention provides bictegravir magnesium.

In accordance with another embodiment, the present invention provides a process for the preparation of bictegravir magnesium, comprising:
a) providing a solution of bictegravir and magnesium source in a suitable organic solvent or a mixture thereof at ambient to reflux temperature,
b) cooling the solution to below 30° C.; and
c) isolating bictegravir magnesium.

In accordance with another embodiment, the present invention provides bictegravir magnesium is either amorphous or crystalline in nature.

In accordance with another embodiment, the present invention provides bictegravir magnesium characterized by a powder X-ray diffraction (PXRD) pattern substantially in accordance with FIG. 10.

In accordance with another embodiment, the present invention provides bictegravir magnesium characterized by X-Ray diffraction (XRD) pattern having one or more peaks at about 7.3, 8.4, 9.9, 12.2, 12.5, 13.3, 14.6, 15.1, 16.9, 17.6, 17.7, 18.3, 18.5, 19.1, 19.4, 19.8, 21.1, 21.7, 23.3, 24.0, 24.6, 25.3, 26.4, 26.7, 28.1, 28.5, 29.4, 30.3, 30.5, 30.9, 32.1, 32.7, 33.5, and 35.5±0.2° 2θ.

In accordance with another embodiment, the present invention provides bictegravir zinc.

In accordance with another embodiment, the present invention provides a process for the preparation of bictegravir zinc, comprising:
a) providing a solution of bictegravir and zinc source in a suitable organic solvent or a mixture thereof at ambient to reflux temperature,
b) cooling the solution to below 30° C.; and
c) isolating bictegravir zinc.

In accordance with another embodiment, the present invention provides bictegravir zinc is either amorphous or crystalline in nature.

In accordance with another embodiment, the present invention provides crystalline bictegravir zinc characterized by a powder X-ray diffraction (PXRD) pattern substantially in accordance with FIG. 11.

In accordance with another embodiment, the present invention provides crystalline bictegravir zinc characterized by X-Ray diffraction (XRD) pattern having one or more peaks at about 4.6, 6.0, 6.3, 6.7, 7.1, 7.6, 8.3, 9.2, 9.6, 10.9, 12.0, 12.4, 14.4, 15.1, 15.4, 17.5, 18.0, 19.0, 19.8, 20.1, 22.3, 23.2, 23.8, 24.6, 25.0, 25.6, 26.0, 26.7, 27.3, 29.1, 29.9, 30.6 and 34.68±0.2° 2θ.

In accordance with another embodiment, the present invention provides amorphous bictegravir zinc characterized by a powder X-ray diffraction (PXRD) pattern substantially in accordance with FIG. 12.

In accordance with another embodiment, the present invention provides a process for the preparation of amorphous form of bictegravir zinc, comprising:
   a) suspending or dissolving bictegravir zinc in a suitable organic solvent at ambient to reflux temperature,
   b) stirring the step a) suspension or solution for a period of about 10 minutes to 6 hours,
   c) cooling the solution to below 30° C.; and
   d) isolating the amorphous form of bictegravir zinc.

In accordance with another embodiment, the present invention provides bictegravir calcium.

In accordance with another embodiment, the present invention provides a process for the preparation of bictegravir calcium, comprising:
   a) providing a solution of bictegravir and calcium source in a suitable organic solvent or a mixture thereof at ambient to reflux temperature,
   b) cooling the solution to below 30° C.; and
   c) isolating bictegravir calcium.

In accordance with another embodiment, the present invention provides bictegravir calcium is either amorphous or crystalline in nature.

In accordance with another embodiment, the present invention provides crystalline bictegravir calcium characterized by a powder X-ray diffraction (PXRD) pattern substantially in accordance with FIG. 13.

In accordance with another embodiment, the present invention provides crystalline bictegravir calcium characterized by X-Ray diffraction (XRD) pattern having one or more peaks at about 5.2, 7.1, 9.9, 11.2, 11.3, 13.4, 14.2, 16.0, 16.8, 19.0, 19.6, 21.4, 21.8, 22.2, 22.8, 24.6, 25.5, 27.0 and 32.4±0.2° 2θ.

In accordance with another embodiment, the present invention provides amorphous bictegravir calcium characterized by a powder X-ray diffraction (PXRD) pattern substantially in accordance with FIG. 14.

In accordance with another embodiment, the present invention provides a process for the preparation of amorphous form of bictegravir calcium, comprising:
   a) suspending or dissolving bictegravir calcium in a suitable organic solvent at ambient to reflux temperature,
   b) stirring the step a) suspension or solution for a period of about 10 minutes to 6 hours,
   c) cooling the solution to below 30° C.; and
   d) isolating the amorphous form of bictegravir calcium.

In accordance with another embodiment, the present invention provides a process for preparation of bictegravir of Formula I:

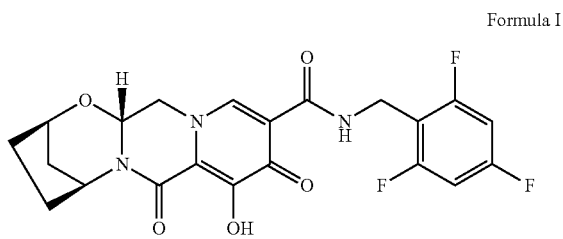 [SMILES: O=C(NCc1c(F)cc(F)cc1F)c1cn2c(c(O)c1=O)C(=O)N1[C@H]3CC[C@H](C3)O[C@@H]1C2]

Formula I comprising:
   a) reacting a compound of Formula II with a compound of Formula III in presence of a suitable activation agent and a suitable base in a suitable solvent to obtain a compound of Formula IV, and

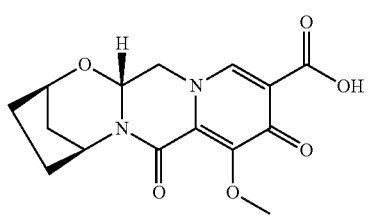

Formula II

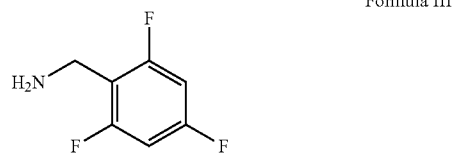

Formula III

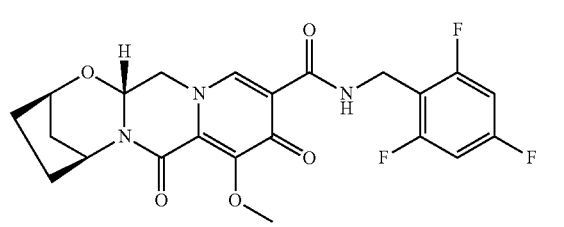

Formula IV b) demethylating the compound of Formula IV in presence of a suitable deprotecting agent to obtain bictegravir of Formula I;

wherein the suitable activation agent is selected from the group comprising 2-chloro-4,6-dimethoxy-1,3,5-triazine, carbonyldiimidazole (CDI), 1-ethyl-3-(3-dimethyl amino propyl)carbodiimide hydrochloride (EDC·HCl), 1-Hhydroxybenzotriazole (HOBt), 3-[bis(dimethylamino)methyliumyl]-3H-benzotriazol-1-oxide hexafluoro phosphate (HBTU), O-(1H-6-Chlorobenzotriazole-1-yl)-1,1,3,3-tetramethyluronium hexafluoro phosphate (HCTU), O-(benzotriazol-1-yl)-N,N,N,N'-tetramethyluronium tetrafluoroborate (TBTU), propylphosphonic anhydride (T$_3$P), dicyclohexylcarbodiimide (DCC), 3-hydroxytriazolo[4,5-b] pyridine (HOAT), thionyl chloride (SOCl$_2$), oxalyl chloride (COCl)$_2$, phosphorus oxychloride (POCl$_3$), pivaloyl chloride (PivCl), acetic anhydride (Ac$_2$O), N-ethoxycarbonyl-2-ethoxy-1,2-dihydroquinoline (EEQD), Methanesulfonyl chloride (MsCl) and p-toluenesulfonyl chloride (TsCl) and the like and mixture thereof.

In accordance with another embodiment, the present invention provides a process for purification of bictegravir of Formula I, comprising:
   a) suspending or dissolving bictegravir of Formula I in a suitable solvent,
   b) separating the undissolved solids from the step a) suspension or solution, and
   c) isolating the bictegravir of Formula I.

In accordance with another embodiment, the present invention provides a process for purification of bictegravir of Formula I, comprising:
   a) suspending or dissolving bictegravir of Formula I in a suitable solvent,
   b) separating the undissolved solids from the step a) suspension or solution, and
   c) isolating the bictegravir of Formula I; wherein the suitable solvent is selected from the group comprising alcohols, esters, halogenated hydrocarbons and mixtures thereof.

In accordance with another embodiment, the present invention provides a process for purification of bictegravir of Formula I, comprising:
a) suspending or dissolving bictegravir of Formula I in a suitable solvent selected from the group comprising methanol, tertiary butanol, ethyl acetate, methylene chloride and mixtures thereof,
b) separating the undissolved solids from the step a) suspension or solution, and
c) isolating the bictegravir of Formula I.

In accordance with another embodiment, the present invention provides a process for purification of bictegravir of Formula I with diastereomer impurity less than 0.15% by HPLC, comprising:
a) suspending or dissolving bictegravir of Formula I with diastereomer impurity more than 0.15% by HPLC in a suitable solvent,
b) separating the diastereomer impurity from step a) suspension or solution, and
c) isolating the bictegravir of Formula I with diastereomer impurity less than 0.15% by HPLC.

In accordance with another embodiment, the present invention provides a process for purification of bictegravir of Formula I with diastereomer impurity less than 0.15% by HPLC, comprising:
a) suspending or dissolving bictegravir of Formula I with diastereomer impurity more than 0.15% by HPLC in a suitable solvent selected from the group comprising alcohols, esters, halogenated hydrocarbons or mixture thereof at ambient to reflux temperature,
b) separating the diastereomer impurity from step a) suspension or solution, and
c) isolating the bictegravir of Formula I with diastereomer impurity less than 0.15% by HPLC.

In accordance with another embodiment, the present invention provides a process for preparation of bictegravir of Formula I with diastereomer impurity less than 0.15% by HPLC, comprising:
a) reacting a compound of Formula II with a compound of Formula III in presence of a suitable activation agent and a suitable base in a suitable solvent to obtain a compound of Formula IV,
b) demethylating the compound of Formula IV in presence of a suitable deprotecting agent to obtain bictegravir of Formula I,
c) suspending or dissolving bictegravir of Formula I in a suitable solvent selected from the group comprising alcohols, esters, halogenated hydrocarbons or mixture thereof at ambient to reflux temperature,
d) separating the diastereomer impurity from step c) suspension or solution, and
e) isolating the bictegravir of Formula I with diastereomer impurity less than 0.15% by HPLC;
wherein the suitable activation agent is selected from the group comprising 2-chloro-4,6-dimethoxy-1,3,5-triazine, carbonyldiimidazole (CDI), 1-ethyl-3-(3-dimethylamino propyl)carbodiimide hydrochloride (EDC·HCl), 1-Hhydroxybenzotriazole (HOBt), 3-[bis(dimethylamino)methyliumyl]-3H-benzotriazol-1-oxide hexafluorophosphate (HBTU), O-(1H-6-Chlorobenzotriazole-1-yl)-1,1,3,3-tetramethyluronium hexafluorophosphate (HCTU), O-(benzotriazol-1-yl)-N,N,N',N'-tetramethyluronium tetrafluoroborate (TBTU), propylphosphonic anhydride (T$_3$P), dicyclohexylcarbodiimide (DCC), 3-hydroxytriazolo[4,5-b]pyridine (HOAT), thionyl chloride (SOCl$_2$), oxalyl chloride (COCl)$_2$, phosphorus oxychloride (POCl$_3$), pivaloyl chloride (PivCl), acetic anhydride (Ac$_2$O), N-ethoxycarbonyl-2-ethoxy-1,2-dihydroquinoline (EEQD), Methanesulfonyl chloride (MsCl) and p-toluenesulfonyl chloride (TsCl) and the like and mixture thereof.

In accordance with another embodiment, the present invention provides a pharmaceutical composition comprising bictegravir, its salts, co-crystals, solvates or hydrates thereof prepared by the processes of the present invention and at least one pharmaceutically acceptable excipient.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

The present invention encompasses improved process for preparation of bictegravir. The present invention also involves novel crystalline polymorphic forms of bictegravir, its salts, co-crystals, solvates or hydrates thereof, process for their preparation and pharmaceutical composition comprising one or more of the novel polymorphic forms of bictegravir, its salts, co-crystals, solvates or hydrates thereof.

The polymorphs of bictegravir, its salts, co-crystals, solvates or hydrates thereof obtained by process of the present invention are characterized by X-ray powder diffraction (XRPD) pattern, differential scanning calorimetric (DSC) and thermo gravimetric analysis (TGA).

The X-Ray powder diffraction data reported herein is analyzed using PANalytical X'per$^3$pro X-ray powder Diffractometer equipped with a Cu-anode ([λ]=1.54 Angstrom), X-ray source operated at 45 kV, 40 mA. Two-theta calibration is performed using an NIST SRM 640c Si standard. The sample was analyzed using the following instrument parameters: measuring range=3-45° 2θ; step size=0.01°; and Time per step=50 sec.

The differential scanning calorimetric data reported herein is analyzed in hermetically sealed aluminium pan with a pin hole, with a blank hermetically sealed aluminium pan with a pin hole as the reference and were obtained using DSC (DSC Q200, TA instrumentation, Waters) at a scan rate of 10° C. per minute with an Indium standard.

The thermo gravimetric analysis data reported herein is analyzed using TGA Q500 in platinum pan with a temperature rise of about 10° C./min in the range of about room temperature to about 250° C.

As used herein in this specification, unless otherwise specified, bictegravir, which is used as a starting material is known in the art and can be prepared by the process disclosed in this specification or can be prepared by the process known in art, for example bictegravir or its sodium may be synthesized as disclosed in the '323 publication. The starting bictegravir may be in any form such as crude obtained directly from the reaction mass, crystalline, amorphous or other forms of bictegravir, including various solvates and hydrates known in the art.

In accordance with one embodiment, the present invention provides novel crystalline polymorphic form of bictegravir sodium; which are designated herein as bictegravir sodium Form-L, bictegravir sodium Form-L1, bictegravir sodium Form-L2, bictegravir sodium Form-L3, bictegravir sodium Form-L4, bictegravir sodium Form-L5 and bictegravir sodium Form-L6.

In another embodiment, the present invention provides novel crystalline polymorphic form of bictegravir sodium Form-L.

Figure 1:
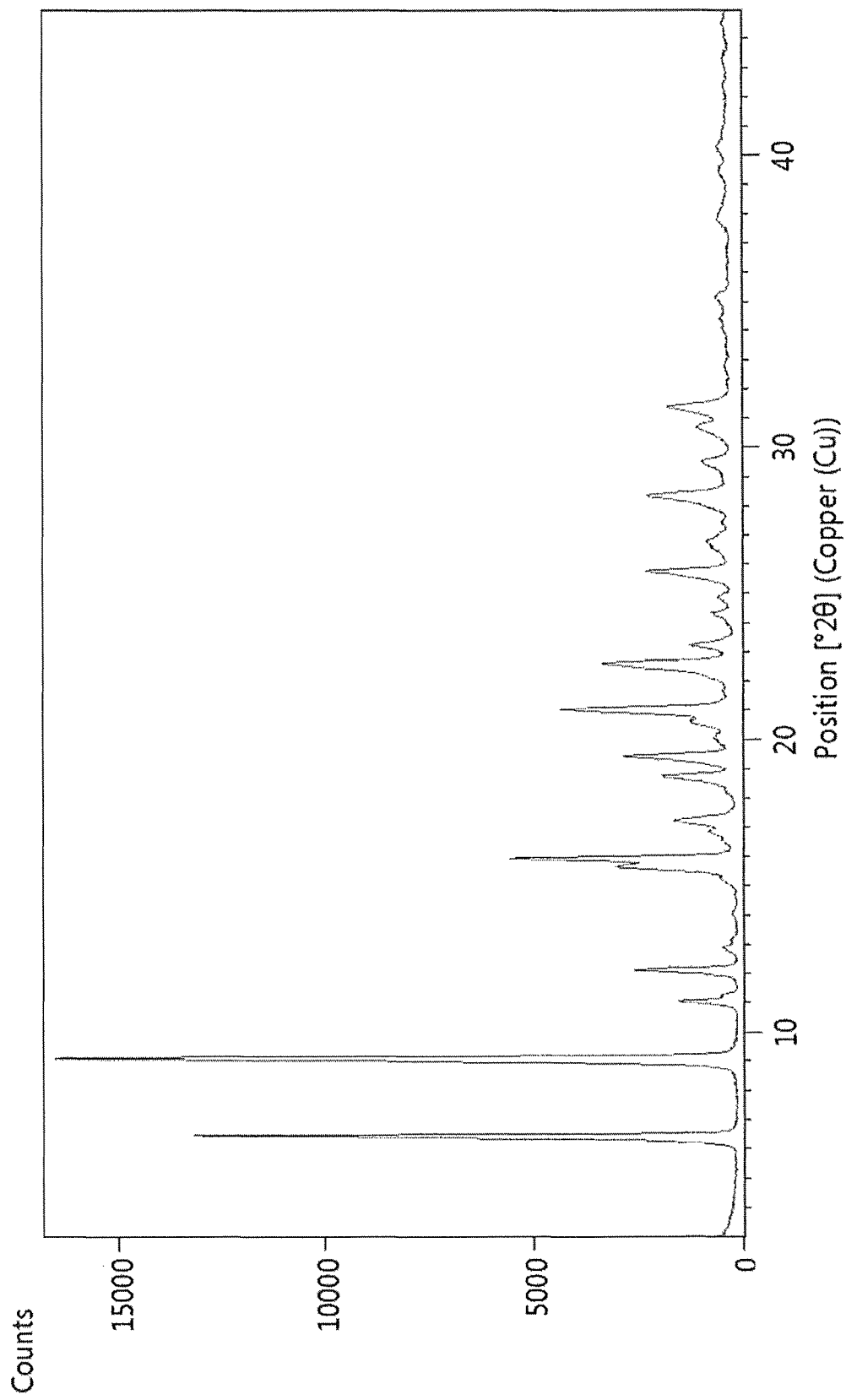
FIG. 1 is the characteristic powder X-ray diffraction (PXRD) pattern of crystalline bictegravir sodium Form-L.

In another embodiment, the present invention provides bictegravir sodium Form-L characterized by a powder X-ray diffraction (PXRD) pattern substantially in accordance with FIG. 1.

In another embodiment, the present invention provides bictegravir sodium Form-L characterized by X-Ray diffraction (XRD) pattern having one or more peaks at about 6.5, 9.1, 11.1, 11.3, 12.1, 12.9, 13.1, 14.0, 15.2, 15.6, 15.9, 16.5, 16.8, 17.2, 18.2, 18.8, 19.4, 19.9, 20.5, 21.1, 21.7, 22.6, 23.2, 24.3, 24.9, 25.6, 25.7, 26.5, 26.8, 27.4, 28.4, 29.6, 30.8, 31.4, 32.8, 34.5 and 35.1±0.2° 2θ.

In a specific embodiment, the present invention provides bictegravir sodium Form-L characterized by X-Ray diffraction (XRD) pattern having one or more peaks at about 9.1, 11.1, 11.3 and 12.1±0.2° 2θ.

In another embodiment, the present invention provides a process for preparation of bictegravir sodium Form-L, comprising:
a) suspending or dissolving bictegravir in methylene chloride or trifluoroethanol at 25° C. to reflux temperature,
b) optionally cooling the step a) reaction mass to below 25° C.,
c) adding sodium source to step a) or step b) reaction mass or vice-versa, and
d) isolating bictegravir sodium Form-L.

The aforementioned process of step a) involves suspending or dissolving bictegravir in methylene chloride or trifluoroethanol at about 25° C. to reflux temperature; preferably at about 25° C. to about 100° C. Then, the resultant reaction mass may be optionally cooled to below 25° C., preferably below 10° C., more preferably to between −20° C. to about 5° C.

The step c) of aforementioned process involves, adding sodium source to step a) or step b) reaction mass or adding step a) or step b) reaction mass to sodium source at below 25° C., preferably below 10° C., more preferably at about −20° C. to about 5° C. and allowed to stir for about 10 min to about 10 hrs. Then the precipitated bictegravir sodium Form-L can be recovered by any conventional techniques, for example decantation, filtration. The resultant product may be further dried at suitable temperatures i.e. about 25° C. to about 75° C. for sufficient period of time.

The sodium source used herein for preparing Form L is selected from the group comprising aqueous or alcoholic sodium hydroxide, sodium formate, sodium acetate and sodium alkoxide. The alcohol used in the alcoholic solution of sodium hydroxide includes but are not limited to methanol, ethanol, butanol, isobutanol, propanol, isopropanol, pentanol, glycerol and the like and mixtures thereof. Sodium alkoxide used herein selected from sodium methoxide, sodium ethoxide, sodium butoxide, sodium pentoxide and the like and mixtures thereof; preferably methanolic sodium hydroxide, aqueous sodium hydroxide and mixture thereof.

In another embodiment, the present invention provides crystalline polymorphic form of bictegravir sodium Form-L1.

In another embodiment, the crystalline polymorphic form of bictegravir sodium Form-L1 of the present invention is Isopentanol solvate.

Figure 2:
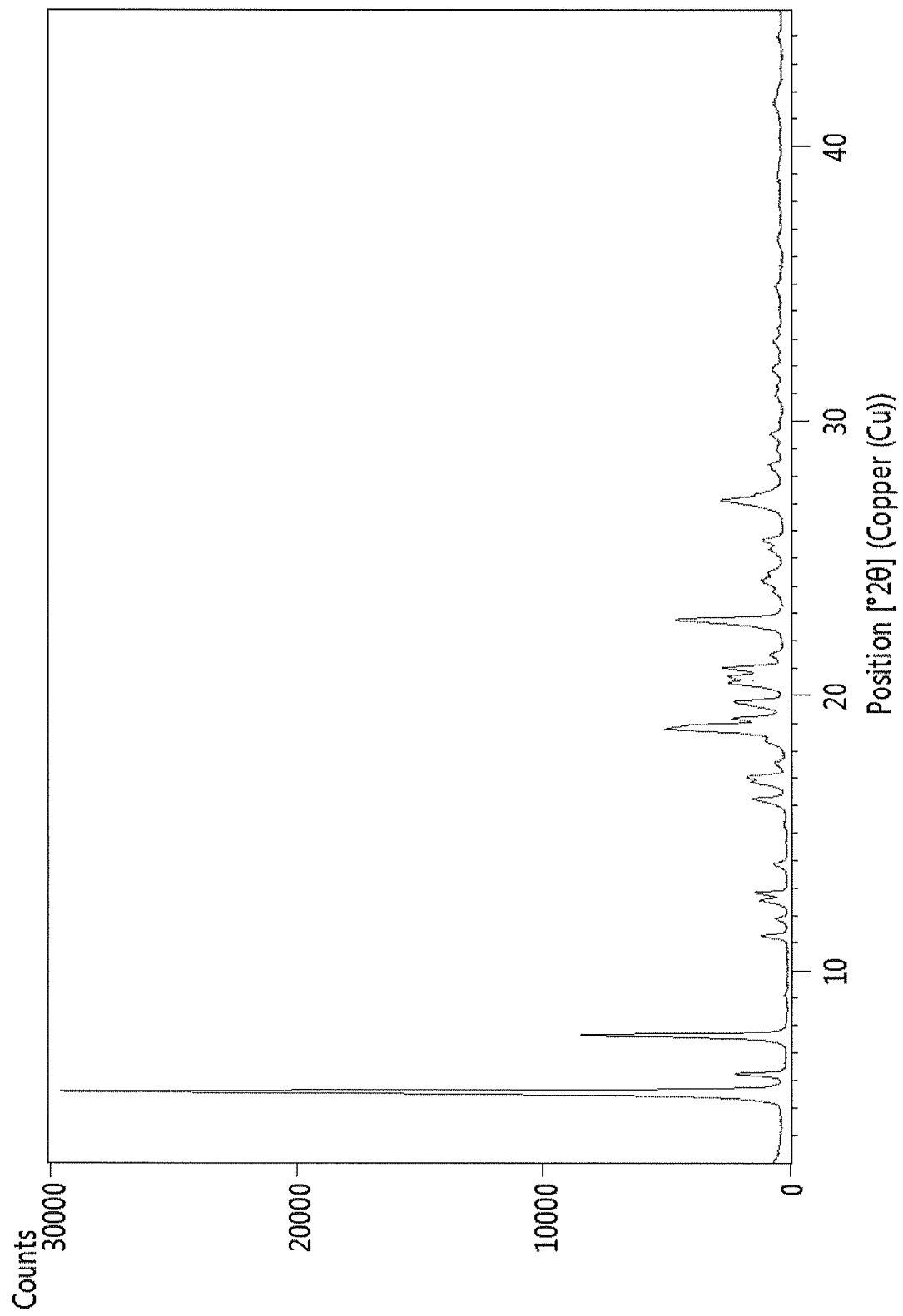
FIG. 2 is the characteristic powder X-ray diffraction (PXRD) pattern of crystalline bictegravir sodium Form-L1.

In another embodiment, the present invention provides bictegravir sodium Form-L1 characterized by a powder X-ray diffraction (PXRD) pattern substantially in accordance with FIG. 2.

In another embodiment, the present invention provides bictegravir sodium Form-L1 characterized by X-Ray diffraction (XRD) pattern having one or more peaks at about 5.6, 6.2, 7.7, 9.1, 11.3, 11.9, 12.6, 12.8, 13.9, 15.4, 16.2, 16.8, 17.0, 17.6, 18.4, 18.8, 18.9, 19.2, 19.8, 20.5, 20.7, 21.0, 21.5, 22.8, 23.8, 24.2, 24.5, 25.3, 25.7, 27.1, 28.4, 28.8, 29.5, 30.0, 30.9, 31.3, 31.8, 32.9, 33.4, 34.0, and 34.9±0.2° 2θ.

In another embodiment, the present invention provides a process for preparation of bictegravir sodium Form-L1, comprising:
a) suspending or dissolving bictegravir in a mixture of isopentanol and acetonitrile at 25° C. to reflux temperature,
b) optionally cooling the step a) reaction mass to below 25° C.,
c) adding sodium source to step a) or step b) reaction mass or vice-versa, and
d) isolating bictegravir sodium Form-L1.

The aforementioned process of step a) involves suspending or dissolving bictegravir in a mixture of isopentanol and acetonitrile at about 25° C. to reflux temperature, preferably at about 25° C. to about 100° C. Then, the resultant reaction mass may be optionally cooled to below 25° C., preferably less than 10° C.

The step c) of aforementioned process involves, adding sodium source to step a) or step b) reaction mass or vice-versa at below 10° C., preferably sodium source is added to step a) or step b) reaction mass. The reaction mass may be allowed to stir for about 30 min to about 10 hrs. Then the precipitated bictegravir sodium Form-L1 can be recovered by any conventional techniques, for example filtration. The resultant product may be further dried at suitable temperatures i.e. about 25° C. to about 35° C. for sufficient period of time of about 1 hr to 30 hours.

The sodium source used herein for preparing Form L1 is selected from the group comprising aqueous or alcoholic sodium hydroxide, sodium formate, sodium acetate and sodium alkoxide. The alcohol used in the alcoholic solution of sodium hydroxide includes but are not limited to methanol, ethanol, butanol, isobutanol, propanol, isopropanol, pentanol, glycerol and the like and mixtures thereof. Sodium alkoxide used herein selected from sodium methoxide, sodium ethoxide, sodium butoxide, sodium pentoxide and the like and mixtures thereof; preferably aqueous sodium hydroxide.

In another embodiment, bictegravir sodium Form-L1 prepared by the process as mentioned just above is a isopentanol solvate having solvent content of about 16% by proton nuclear magnetic resonance ($^1$H-NMR).

In another embodiment, the present invention provides crystalline polymorphic form of bictegravir sodium Form-L2.

Figure 3:
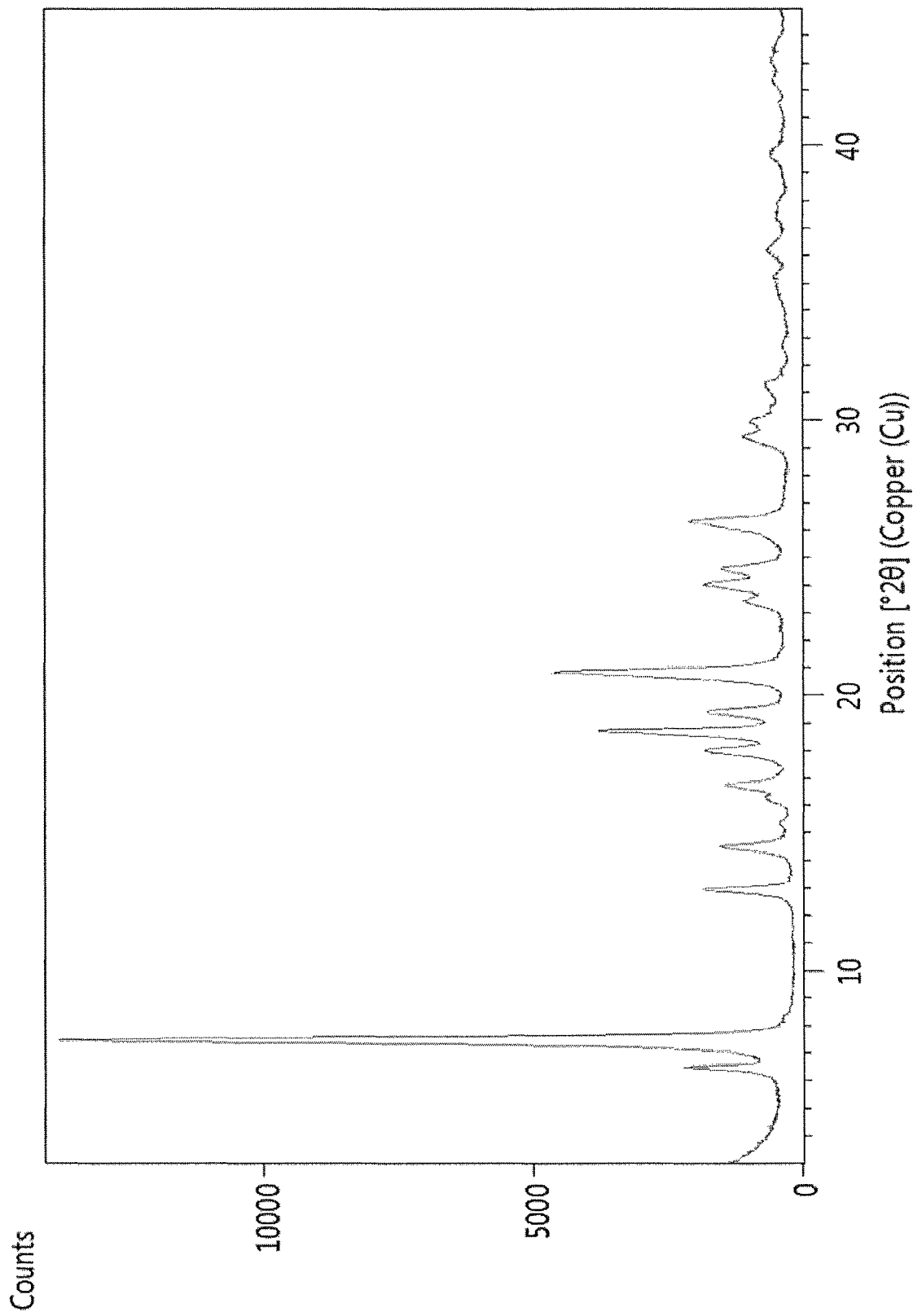
FIG. 3 is the characteristic powder X-ray diffraction (PXRD) pattern of crystalline bictegravir sodium Form-L2.

In another embodiment, the present invention provides bictegravir sodium Form-L2 characterized by a powder X-ray diffraction (PXRD) pattern substantially in accordance with FIG. 3.

In another embodiment, the present invention provides bictegravir sodium Form-L2 characterized by X-Ray diffraction (XRD) pattern having one or more peaks at about 6.5, 7.5, 8.3, 13.0, 14.4, 14.5, 15.4, 16.2, 16.7, 18.0, 18.6, 18.7, 19.4, 20.8, 20.9, 23.4, 24.0, 24.6, 26.3, 29.4, 30.0, 31.4, 32.8 and 35.3±0.2° 2θ.

In another embodiment, the present invention provides a process for preparation of bictegravir sodium Form-L2, the process comprising:
a) suspending or dissolving bictegravir in a mixture of isopentanol and acetonitrile at 25° C. to reflux temperature,
b) optionally cooling the step a) reaction mass to below 25° C.,
c) adding sodium source to step a) or step b) reaction mass,
d) isolating the wet solid, and
e) drying the solid at a temperature of about 35° C. to about 120° C. to obtain bictegravir sodium Form-L2.

The aforementioned process of step a) involves suspending or dissolving bictegravir in a mixture of isopentanol and acetonitrile at about 25° C. to reflux temperature, preferably at about 25° C. to about 100° C. Then, the resultant reaction mass may be optionally cooled to below 25° C., preferably less than 10° C.

The step c) of aforementioned process involves, adding sodium source to step a) or step b) reaction mass or vice-versa at below 10° C., preferably sodium source is added to step a) or step b) reaction mass. The reaction mass may be allowed to stir for about 30 min to about 10 hrs. Then the precipitated bictegravir sodium Form-L1 can be recovered by any conventional techniques, for example filtration. The resultant product may be dried at about 35° C. to about 120° C. for sufficient period of time of about 1 hr to 30 hours, preferably at about 85° to 90° C.

The sodium source used herein for preparing Form L2 is selected from the group comprising aqueous or alcoholic sodium hydroxide, sodium formate, sodium acetate and sodium alkoxide. The alcohol used in the alcoholic solution of sodium hydroxide includes but are not limited to methanol, ethanol, butanol, isobutanol, propanol, isopropanol, pentanol, glycerol and the like and mixtures thereof. Sodium alkoxide used herein selected from sodium methoxide, sodium ethoxide, sodium butoxide, sodium pentoxide and the like and mixtures thereof; preferably aqueous sodium hydroxide.

In another embodiment, the present invention provides a process for preparation of bictegravir sodium Form-L2, the process comprising: subjecting to heating bictegravir sodium Form-L1 at a temperature of about 35° C. to about 120° C., wherein the bictegravir sodium Form-L1 characterized by an XRPD pattern substantially in accordance with FIG. 2.

In another embodiment, the heating is carried out at a temperature of about 85° C. to about 90° C. for a period of about 30 minutes to about 20 hours under vacuum or until complete conversion of bictegravir sodium Form-L1 to bictegravir sodium Form-L2.

In another embodiment, desolvated bictegravir sodium Form-L2 prepared by the process as mentioned just above having a solvent content of about less than 1% by proton nuclear magnetic resonance ($^1$H-NMR).

In another embodiment, the present invention provides crystalline polymorphic form of bictegravir sodium Form-L3.

In another embodiment, the crystalline polymorphic form of bictegravir sodium Form-L3 of the present invention is n-butanol solvate.

Figure 4:
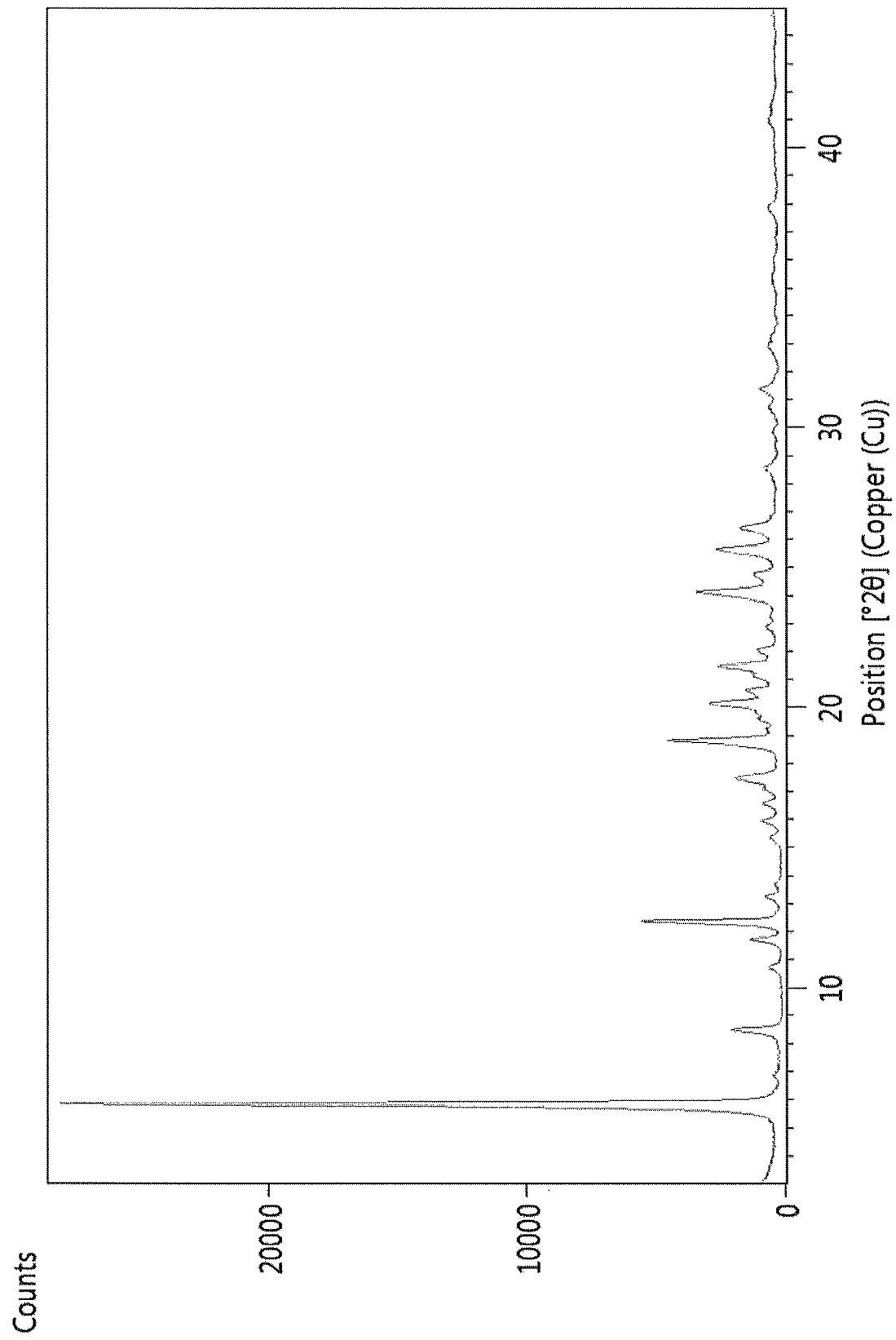
FIG. 4 is the characteristic powder X-ray diffraction (PXRD) pattern of crystalline bictegravir sodium Form-L3.

In another embodiment, the present invention provides bictegravir sodium Form-L3 characterized by a powder X-ray diffraction (PXRD) pattern substantially in accordance with FIG. 4.

In another embodiment, the present invention provides bictegravir sodium Form-L3 characterized by X-Ray diffraction (XRD) pattern having one or more peaks at about 5.9, 6.8, 8.5, 10.7, 11.7, 12.4, 13.2, 13.7, 15.4, 15.9, 16.6, 17.0, 17.5, 18.8, 19.6, 20.2, 20.6, 21.1, 21.5, 22.1, 22.9, 23.3, 24.1, 24.8, 25.6, 26.4, 28.6, 29.8, 30.7, 31.4, 32.9 and 34.1±0.2° 2θ.

In another embodiment, the present invention provides a process for preparation of bictegravir sodium Form-L3, comprising:
a) suspending or dissolving bictegravir in n-butanol at 25° C. to reflux temperature,
b) optionally cooling the step a) reaction mass to below 25° C.,
c) adding sodium source to step a) or step b) reaction mass or vice-versa, and
d) isolating bictegravir sodium Form-L3.

The aforementioned process of step a) involves suspending or dissolving bictegravir in n-butanol at about 25° C. to reflux temperature, preferably at about 25° C. to about 100° C. Then, the resultant reaction mass may be optionally cooled to below 25° C., preferably less than 10° C.

The step of adding sodium source to step a) or step b) reaction mass or vice-versa at below 10° C., preferably sodium source is added to step a) or step b) reaction mass. The reaction mass may be allowed to stir for about 30 min to about 10 hrs. Then the precipitated bictegravir sodium Form-L3 can be recovered by any conventional techniques, for example filtration. The resultant product may be further dried at suitable temperatures i.e. about 25° C. to about 35° C. for sufficient period of time of about 1 hr to 30 hours.

The sodium source used herein for preparing Form L3 is selected from the group comprising aqueous or alcoholic sodium hydroxide, sodium formate, sodium acetate and sodium alkoxide. The alcohol used in the alcoholic solution of sodium hydroxide includes but are not limited to methanol, ethanol, butanol, isobutanol, propanol, isopropanol, pentanol, glycerol and the like and mixtures thereof. Sodium alkoxide used herein selected from sodium methoxide, sodium ethoxide, sodium butoxide, sodium pentoxide and the like and mixtures thereof; preferably aqueous sodium hydroxide.

In another embodiment, bictegravir sodium Form-L3 prepared by the process as mentioned just above is a n-butanol solvate having solvent content of about 15% by proton nuclear magnetic resonance ($^1$H-NMR).

In another embodiment, the present invention provides crystalline polymorphic form of bictegravir sodium Form-L4.

In another embodiment, the crystalline polymorphic form of bictegravir sodium Form-L4 of the present invention is n-pentanol solvate.

Figure 5:
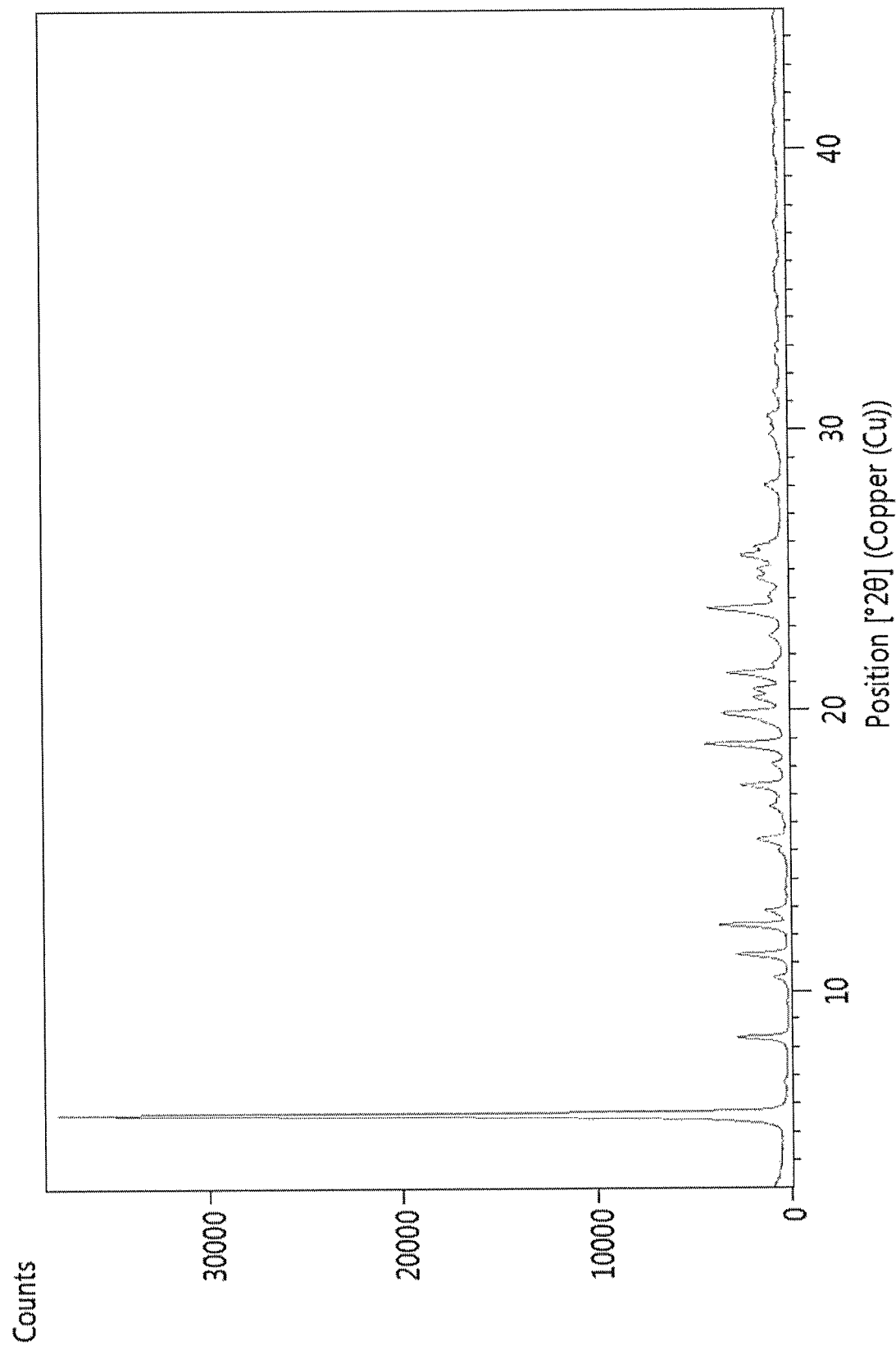
FIG. 5 is the characteristic powder X-ray diffraction (PXRD) pattern of crystalline bictegravir sodium Form-L4.

In another embodiment, the present invention provides bictegravir sodium Form-L4 characterized by a powder X-ray diffraction (PXRD) pattern substantially in accordance with FIG. 5.

In another embodiment, the present invention provides bictegravir sodium Form-L4 characterized by X-Ray diffraction (XRD) pattern having one or more peaks at about 5.6, 6.8, 8.4, 10.5, 11.3, 12.4, 12.9, 13.6, 15.0, 15.4, 16.6, 17.3, 18.1, 18.8, 19.5, 19.9, 20.5, 20.8, 21.3, 21.7, 22.6, 23.7, 24.0, 24.7, 25.0, 25.6, 25.8, 27.3, 28.0, 29.8, 30.5, 31.3, 32.4, 33.0, 34.2 and 35.0±0.2° 2θ.

In another embodiment, the present invention provides a process for preparation of bictegravir sodium Form-L4, comprising:
a) suspending or dissolving bictegravir in n-pentanol at 25° C. to reflux temperature,
b) optionally cooling the step a) reaction mass to below 25° C.,
c) adding sodium source to step a) or step b) reaction mass or vice-versa, and
d) isolating bictegravir sodium Form-L4.

The aforementioned process of step a) involves suspending or dissolving bictegravir in n-pentanol at about 25° C. to reflux temperature, preferably at about 25° C. to about 100° C. Then, the resultant reaction mass may be optionally cooled to below 25° C., preferably less than 10° C.

The step c) of aforementioned process involves, adding sodium source to step a) or step b) reaction mass or vice-versa at below 10° C., preferably sodium source is added to step a) or step b) reaction mass. The reaction mass may be allowed to stir for about 30 min to about 10 hrs. Then the precipitated bictegravir sodium Form-L4 can be recovered by any conventional techniques, for example filtration. The resultant product may be further dried at suitable temperatures i.e. about 25° C. to about 35° C. for sufficient period of time of about 1 hr to 30 hours.

The sodium source used herein for preparing Form L4 is selected from the group comprising aqueous or alcoholic sodium hydroxide, sodium formate, sodium acetate and sodium alkoxide. The alcohol used in the alcoholic solution of sodium hydroxide includes but are not limited to methanol, ethanol, butanol, isobutanol, propanol, isopropanol, pentanol, glycerol and the like and mixtures thereof. Sodium alkoxide used herein selected from sodium methoxide, sodium ethoxide, sodium butoxide, sodium pentoxide and the like and mixtures thereof; preferably aqueous sodium hydroxide.

In another embodiment, bictegravir sodium Form-L4 prepared by the process as mentioned just above is a n-pentanol solvate having solvent content of about 16% by proton nuclear magnetic resonance ($^1$H-NMR).

In another embodiment, the present invention provides crystalline polymorphic form of bictegravir sodium Form-L5.

In another embodiment, the crystalline polymorphic form of bictegravir sodium Form-L5 of the present invention is n-propanol solvate.

Figure 6:
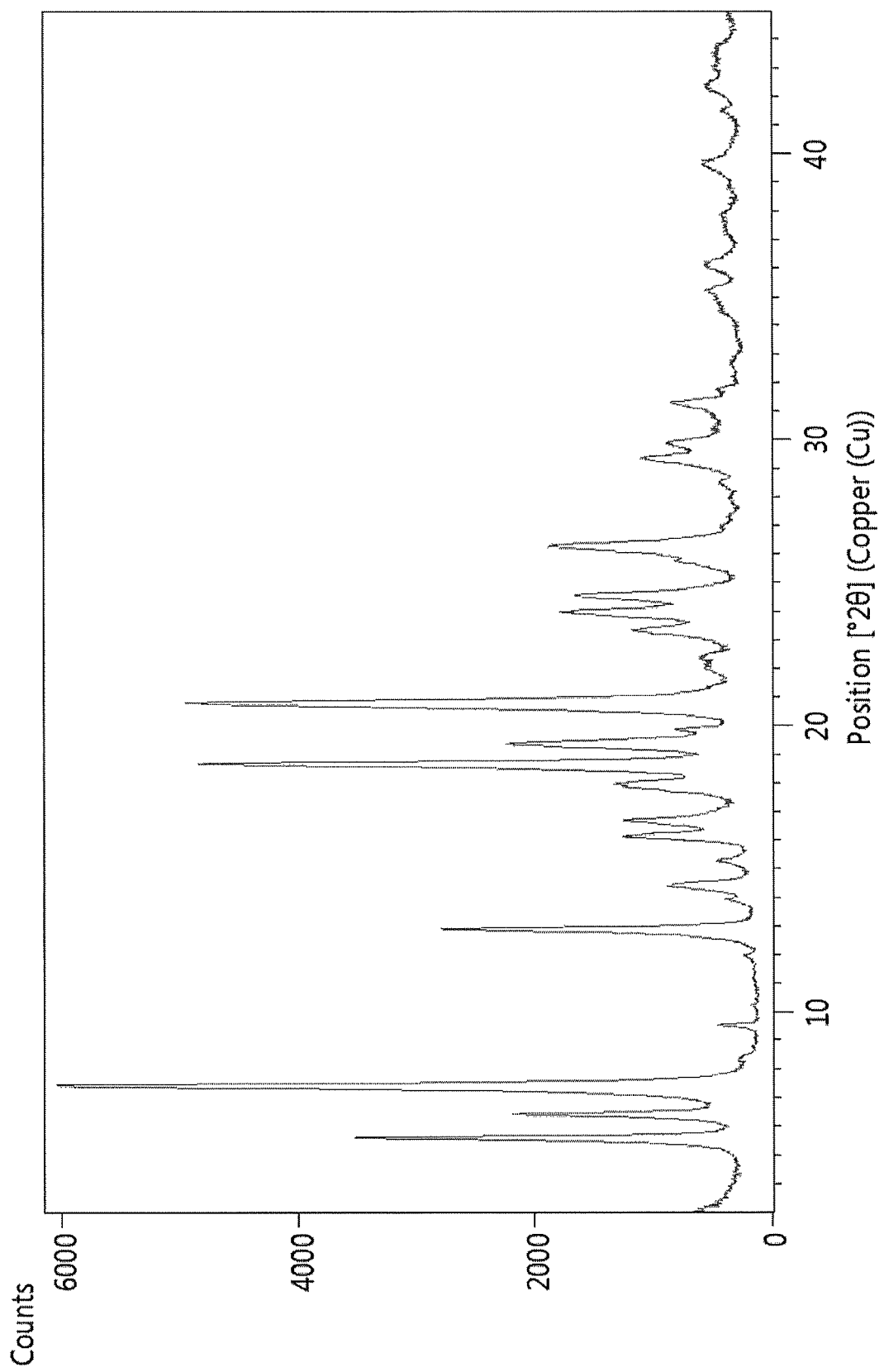
FIG. 6 is the characteristic powder X-ray diffraction (PXRD) pattern of crystalline bictegravir sodium Form-L5.

In another embodiment, the present invention provides bictegravir sodium Form-L5 characterized by a powder X-ray diffraction (PXRD) pattern substantially in accordance with FIG. 6.

In another embodiment, the present invention provides bictegravir sodium Form-L5 characterized by X-Ray diffraction (XRD) pattern having one or more peaks at about 5.6, 6.4, 7.4, 8.4, 9.5, 10.2, 12.0, 12.9, 13.9, 14.4, 15.3, 16.1, 16.7, 18.0, 18.7, 19.4, 19.9, 20.7, 22.0, 22.4, 23.3, 24.0, 24.6, 25.7, 26.3, 28.5, 29.4, 29.9, 31.3, 31.8 and 32.6±0.2° 2θ.

In another embodiment, the present invention provides a process for preparation of bictegravir sodium Form-L5, comprising:
a) suspending or dissolving bictegravir in n-propanol at 25° C. to reflux temperature,
b) optionally cooling the step a) reaction mass to below 25° C.,
c) adding sodium source to step a) or step b) reaction mass or vice-versa, and
d) isolating bictegravir sodium Form-L5.

The aforementioned process of step a) involves suspending or dissolving bictegravir in n-propanol at about 25° C. to reflux temperature, preferably at about 25° C. to about 100° C. Then, the resultant reaction mass may be optionally cooled to below 25° C., preferably less than 10° C.

The step c) of aforementioned process involves, adding sodium source to step a) or step b) reaction mass or vice-versa at below 10° C., preferably sodium source is added to step a) or step b) reaction mass. The reaction mass may be allowed to stir for about 30 min to about 10 hrs. Then the precipitated bictegravir sodium Form-L5 can be recovered by any conventional techniques, for example filtration. The resultant product may be further dried at suitable temperatures i.e. about 25° C. to about 35° C. for sufficient period of time of about 1 hr to 30 hours.

The sodium source used herein for preparing Form L5 is selected from the group comprising aqueous or alcoholic sodium hydroxide, sodium formate, sodium acetate and sodium alkoxide. The alcohol used in the alcoholic solution of sodium hydroxide includes but are not limited to methanol, ethanol, butanol, isobutanol, propanol, isopropanol, pentanol, glycerol and the like and mixtures thereof. Sodium alkoxide used herein selected from sodium methoxide, sodium ethoxide, sodium butoxide, sodium pentoxide and the like and mixtures thereof; preferably aqueous sodium hydroxide.

In another embodiment, bictegravir sodium Form-L5 prepared by the process as mentioned just above is a n-propanol solvate having solvent content of about 2% by proton nuclear magnetic resonance ($^1$H-NMR).

In another embodiment, the present invention provides crystalline polymorphic form of bictegravir sodium Form-L6.

In another embodiment, the crystalline polymorphic form of bictegravir sodium Form-L6 of the present invention is isobutanol solvate.

Figure 7:
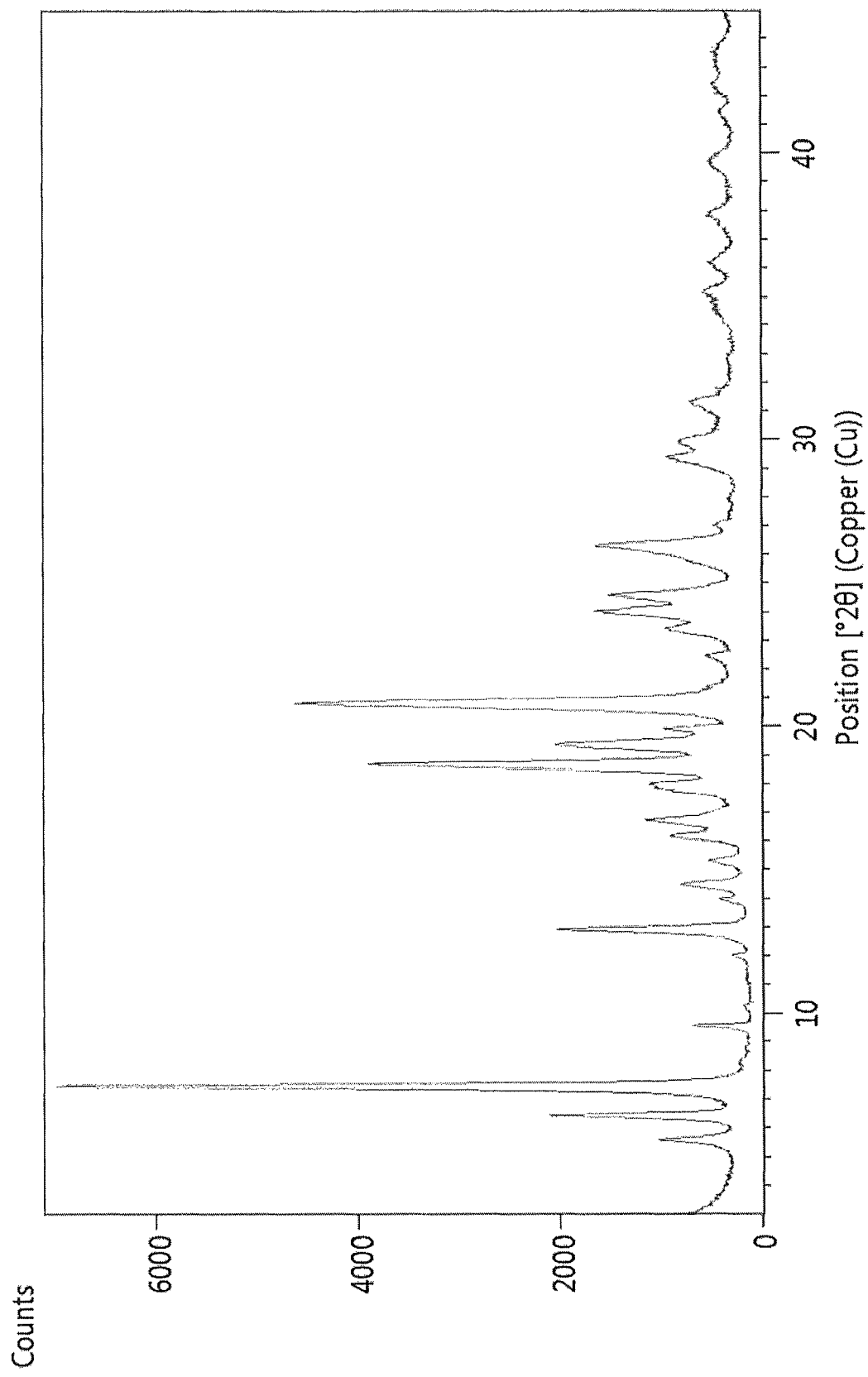
FIG. 7 is the characteristic powder X-ray diffraction (PXRD) pattern of crystalline bictegravir sodium Form-L6.

In another embodiment, the present invention provides bictegravir sodium Form-L6 characterized by a powder X-ray diffraction (PXRD) pattern substantially in accordance with FIG. 7.

In another embodiment, the present invention provides bictegravir sodium Form-L6 characterized by X-Ray diffraction (XRD) pattern having one or more peaks at about 5.6, 6.5, 7.5, 8.3, 9.6, 10.3, 12.0, 12.9, 14.0, 14.5, 15.3, 16.2, 16.7, 17.7, 18.0, 18.7, 19.4, 19.9, 20.8, 20.9, 22.5, 23.4, 24.0, 24.6, 26.3, 27.0, 29.4, 30.0, 31.3, 32.8 and 34.5±0.2° 2θ.

In another embodiment, the present invention provides a process for preparation of bictegravir sodium Form-L6, comprising:
   a) suspending or dissolving bictegravir in isobutanol at 25° C. to reflux temperature,
   b) optionally cooling the step a) reaction mass to below 25° C.,
   c) adding sodium source to step a) or step b) reaction mass or vice-versa, and
   d) isolating bictegravir sodium Form-L6.

The aforementioned process of step a) involves suspending or dissolving bictegravir in isobutanol at about 25° C. to reflux temperature, preferably at about 25° C. to about 100° C. Then, the resultant reaction mass may be optionally cooled to below 25° C., preferably less than 10° C.

The step c) of aforementioned process involves, adding sodium source to step a) or step b) reaction mass or vice-versa at below 10° C., preferably sodium source is added to step a) or step b) reaction mass. The reaction mass may be allowed to stir for about 30 min to about 10 hrs. Then the precipitated bictegravir sodium Form-L6 can be recovered by any conventional techniques, for example filtration. The resultant product may be further dried at suitable temperatures i.e. about 25° C. to about 35° C. for sufficient period of time of about 1 hr to 30 hours.

The sodium source used herein for preparing Form L6 is selected from the group comprising aqueous or alcoholic sodium hydroxide, sodium formate, sodium acetate and sodium alkoxide. The alcohol used in the alcoholic solution of sodium hydroxide includes but are not limited to methanol, ethanol, butanol, isobutanol, propanol, isopropanol, pentanol, glycerol and the like and mixtures thereof. Sodium alkoxide used herein selected from sodium methoxide, sodium ethoxide, sodium butoxide, sodium pentoxide and the like and mixtures thereof; preferably aqueous sodium hydroxide.

In another embodiment, bictegravir sodium Form-L6 prepared by the process as mentioned just above is a isobutanol solvate having solvent content of about 1.5% by proton nuclear magnetic resonance ($^1$H-NMR).

In accordance with another embodiment, the present invention provides novel salt or co-crystal of bictegravir specifically bictegravir diethylamine, bictegravir tromethamine, bictegravir magnesium, bictegravir zinc and bictegravir calcium.

In accordance with another embodiment, the present invention provides bictegravir diethylamine.

In accordance with another embodiment, the present invention provides bictegravir diethylamine is either amorphous or crystalline in nature.

Figure 8:
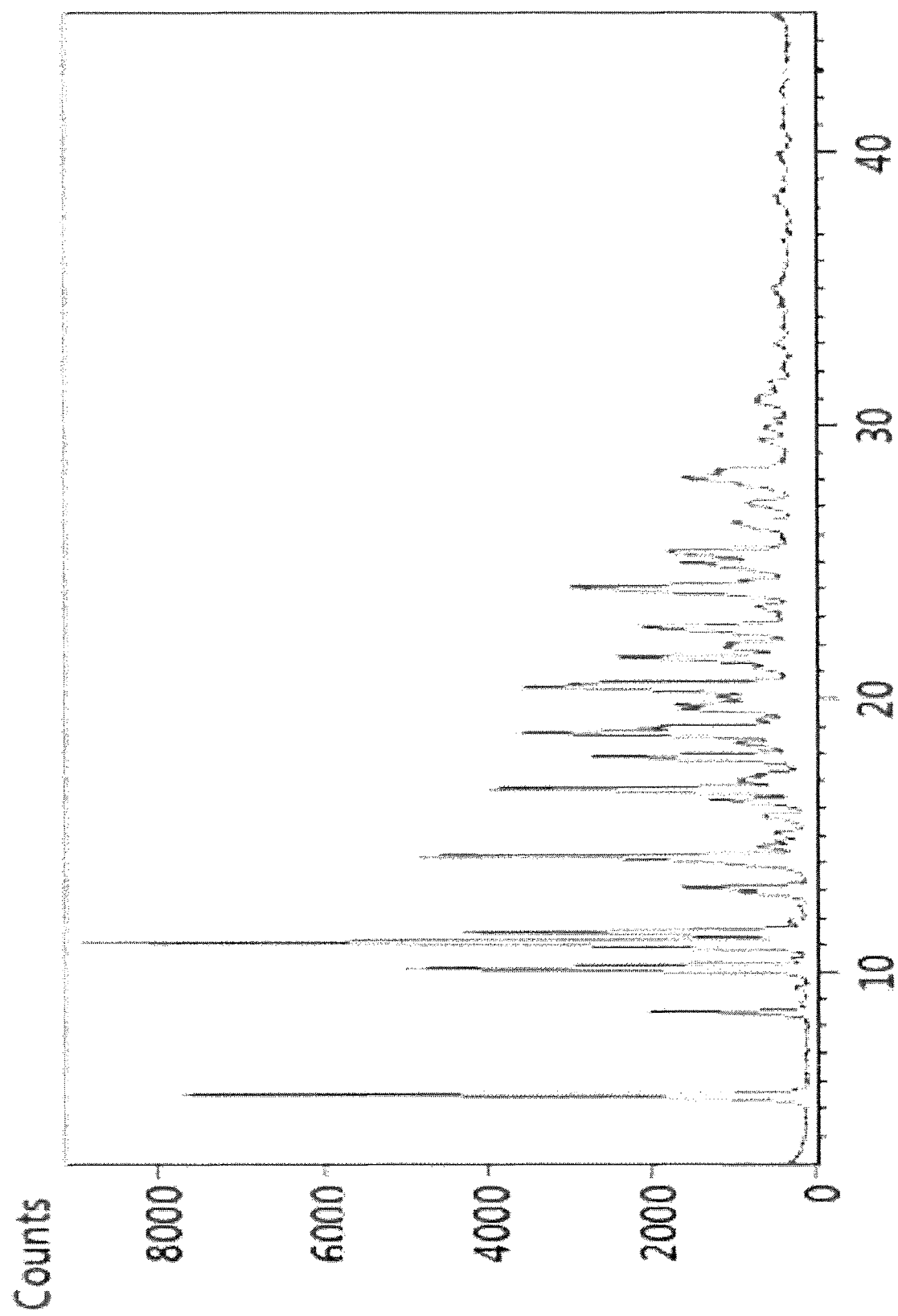
FIG. 8 is the characteristic powder X-ray diffraction (XRD) pattern of bictegravir diethylamine.

In accordance with another embodiment, the present invention provides bictegravir diethylamine characterized by a powder X-ray diffraction (PXRD) pattern substantially in accordance with FIG. 8.

In accordance with another embodiment, the present invention provides bictegravir diethylamine characterized by X-Ray diffraction (XRD) pattern having one or more peaks at about 5.5, 6.9, 8.6, 8.9, 9.4, 10.1, 10.2, 10.5, 11.1, 11.5, 11.6, 11.9, 12.4, 12.9, 13.1, 13.9, 14.2, 14.6, 14.8, 15.1, 15.8, 16.3, 16.7, 16.9, 17.3, 17.9, 18.4, 18.8, 19.0, 19.2, 19.6, 19.8, 20.0, 20.4, 20.6, 21.1, 21.6, 21.9, 22.1, 22.6, 23.0, 23.3, 23.5, 23.9, 24.1, 24.3, 25.0, 25.4, 26.2, 26.5, 27.2, 27.8, 28.1, 28.4, 29.5, 29.9, 30.2, 30.8, 31.1, 31.6, 32.1, 32.3, 33.0, 33.9, 34.4 and 35.1±0.2° 2θ.

In accordance with another embodiment, the present invention provides a process for the preparation of bictegravir diethylamine, comprising:
   a) providing a solution of bictegravir and diethylamine in a suitable organic solvent or a mixture thereof at ambient to reflux temperature,
   b) cooling the solution to below 30° C.; and
   c) isolating bictegravir diethylamine.

The suitable organic solvent used in step a) includes but is not limited to alcohols, ketones, nitriles, ethers, halogenated hydrocarbons, aromatic hydrocarbons and mixtures thereof. The alcohols include, but are not limited to methanol, ethanol, isopropanol, butanol and the like; ketones include, but are not limited to acetone, methyl isobutyl ketone, methyl ethyl ketone and the like; nitriles include, but are not limited to acetonitrile, propionitrile and the like; ethers include, but are not limited to tetrahydrofuran, dimethyl ether, diisopropyl ether, methyl tertiary butyl ether, 1,4-dioxane and the like; halogenated hydrocarbons include, but are not limited to methylene chloride, ethylene chloride, chloroform and the like; aromatic hydrocarbons include, but are not limited to toluene, xylene and the like; water and mixtures thereof; preferably methanol, tetrahydrofuran and mixtures thereof.

The step a) may be heated to about 50° C. to about reflux temperature to obtain a clear solution. Then, the resultant reaction solution can be cooled to below room temperature and stirring the reaction mass for sufficient period of time to precipitate bictegravir diethylamine. Then the bictegravir diethylamine can be recovered by any conventional techniques known in the art, for example filtration. The resultant product may be further dried at suitable temperatures preferably at above room temperature under vacuum.

In accordance with another embodiment, the present invention provides bictegravir tromethamine.

In accordance with another embodiment, the present invention provides bictegravir tromethamine is either amorphous or crystalline in nature.

Figure 9:
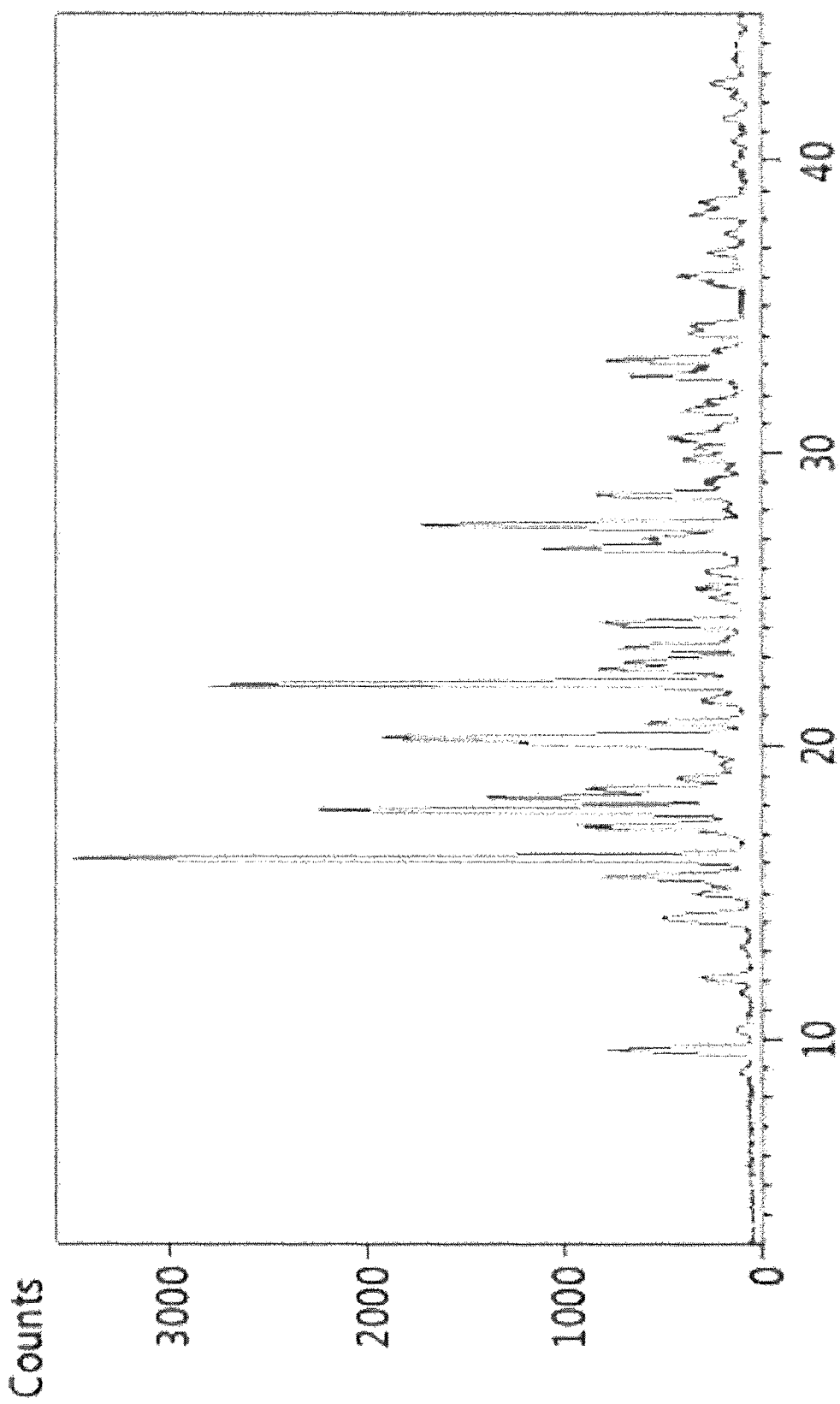
FIG. 9 is the characteristic powder X-ray diffraction (XRD) pattern of bictegravir tromethamine.

In accordance with another embodiment, the present invention provides bictegravir tromethamine characterized by a powder X-ray diffraction (PXRD) pattern substantially in accordance with FIG. 9.

In accordance with another embodiment, the present invention provides bictegravir tromethamine characterized by X-Ray diffraction (XRD) pattern having one or more peaks at about 8.9, 9.6, 10.3, 11.6, 12.0, 12.2, 13.1, 13.9, 14.3, 14.9, 15.0, 15.5, 15.7, 16.1, 16.2, 17.2, 17.3, 17.7, 17.8, 18.2, 18.6, 18.9, 19.3, 19.9, 20.2, 20.7, 21.4, 22.0, 22.6, 22.8, 23.2, 24.0, 24.2, 25.0, 25.3, 25.9, 26.7, 27.1, 27.6, 28.0, 28.6, 29.1, 29.7, 30.1, 30.4, 31.3, 31.2, 32.6, 33.2, 33.5, 34.0, 34.4 and 35.8±0.2° 2θ.

In accordance with another embodiment, the present invention provides a process for the preparation of bictegravir tromethamine, comprising:
   a) providing a solution of bictegravir and tromethamine in a suitable organic solvent or a mixture thereof at ambient to reflux temperature,
   b) cooling the solution to below 30° C.; and
   c) isolating bictegravir tromethamine.

The suitable organic solvent used in step a) includes but is not limited to alcohols, ketones, nitriles, ethers, halogenated hydrocarbons, aromatic hydrocarbons and mixtures thereof.

The alcohols include, but are not limited to methanol, ethanol, isopropanol, butanol and the like; ketones include, but are not limited to acetone, methyl isobutyl ketone, methyl ethyl ketone and the like; nitriles include, but are not limited to acetonitrile, propionitrile and the like; ethers include, but are not limited to tetrahydrofuran, dimethyl ether, diisopropyl ether, methyl tertiary butyl ether, 1,4- dioxane and the like; halogenated hydrocarbons include, but are not limited to methylene chloride, ethylene chloride, chloroform and the like; aromatic hydrocarbons include, but are not limited to toluene, xylene and the like; water and mixtures thereof; preferably methanol.

The step a) may be heated to about 50° C. to about reflux temperature to obtain a clear solution. Then, the resultant reaction solution can be cooled to below room temperature and stirring the reaction mass for sufficient period of time to precipitate bictegravir tromethamine. Then the bictegravir tromethamine can be recovered by any conventional techniques known in the art, for example filtration. The resultant product may be further dried at suitable temperatures preferably at above room temperature under vacuum.

In accordance with another embodiment, the present invention provides bictegravir magnesium.

In accordance with another embodiment, the present invention provides bictegravir magnesium is either amorphous or crystalline in nature.

Figure 10:
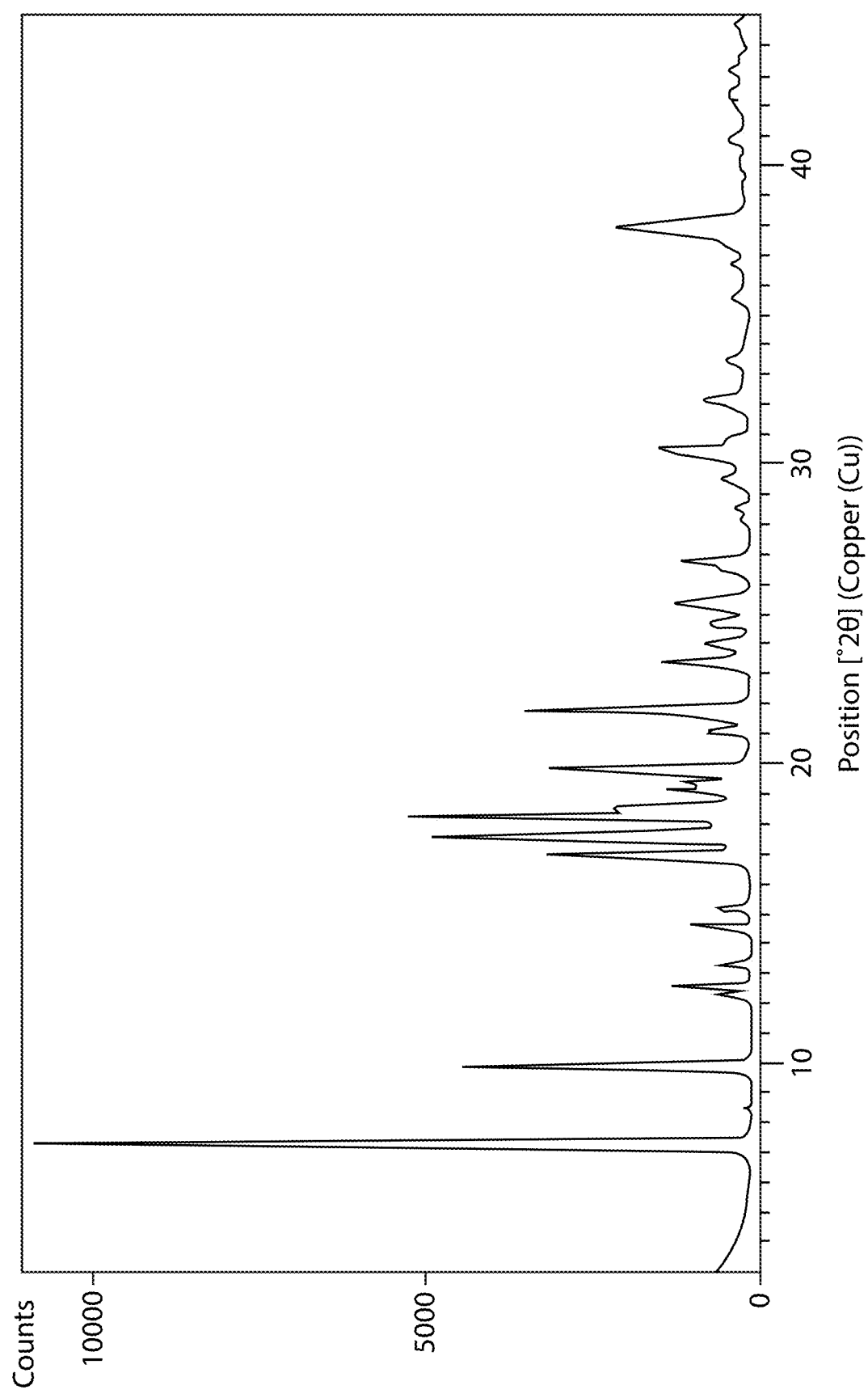
FIG. 10 is the characteristic powder X-ray diffraction (XRD) pattern of bictegravir magnesium.

In another embodiment, the present invention provides bictegravir magnesium characterized by a powder X-ray diffraction (PXRD) pattern substantially in accordance with FIG. 10.

In accordance with another embodiment, the present invention provides bictegravir magnesium characterized by X-Ray diffraction (XRD) pattern having one or more peaks at about 7.3, 8.4, 9.9, 12.2, 12.5, 13.3, 14.6, 15.1, 16.9, 17.6, 17.7, 18.3, 18.5, 19.1, 19.4, 19.8, 21.1, 21.7, 23.3, 24.0, 24.6, 25.3, 26.4, 26.7, 28.1, 28.5, 29.4, 30.3, 30.5, 30.9, 32.1, 32.7, 33.5, and 35.5±0.2° 2θ.

In accordance with another embodiment, the present invention provides a process for the preparation of bictegravir magnesium, comprising:
   a) providing a solution of bictegravir and magnesium source in a suitable organic solvent or a mixture thereof at ambient to reflux temperature,
   b) cooling the solution to below 30° C.; and
   c) isolating bictegravir magnesium.

The suitable organic solvent used in step a) includes but is not limited to alcohols, ketones, nitriles, ethers, halogenated hydrocarbons, aromatic hydrocarbons and mixtures thereof. The alcohols include, but are not limited to methanol, ethanol, isopropanol, butanol and the like; ketones include, but are not limited to acetone, methyl isobutyl ketone, methyl ethyl ketone and the like; nitriles include, but are not limited to acetonitrile, propionitrile and the like; ethers include, but are not limited to tetrahydrofuran, dimethyl ether, diisopropyl ether, methyl tertiary butyl ether, 1,4-dioxane and the like; halogenated hydrocarbons include, but are not limited to methylene chloride, ethylene chloride, chloroform and the like; aromatic hydrocarbons include, but are not limited to toluene, xylene and the like; water and mixtures thereof preferably methanol, water and mixture thereof.

The magnesium source may be selected from magnesium chloride, magnesium bromide, magnesium hydroxide, magnesium acetate and the like; preferably magnesium chloride.

The step a) may be heated to about 50° C. to about reflux temperature to obtain a clear solution. Then, the resultant reaction solution can be cooled to below room temperature and stirring the reaction mass for sufficient period of time to precipitate bictegravir magnesium. Then the bictegravir magnesium can be recovered by any conventional techniques known in the art, for example filtration. The resultant product may be further dried at suitable temperatures preferably at above room temperature under vacuum.

In accordance with another embodiment, the present invention provides bictegravir zinc.

In accordance with another embodiment, the present invention provides bictegravir zinc is either amorphous or crystalline in nature.

Figure 11:
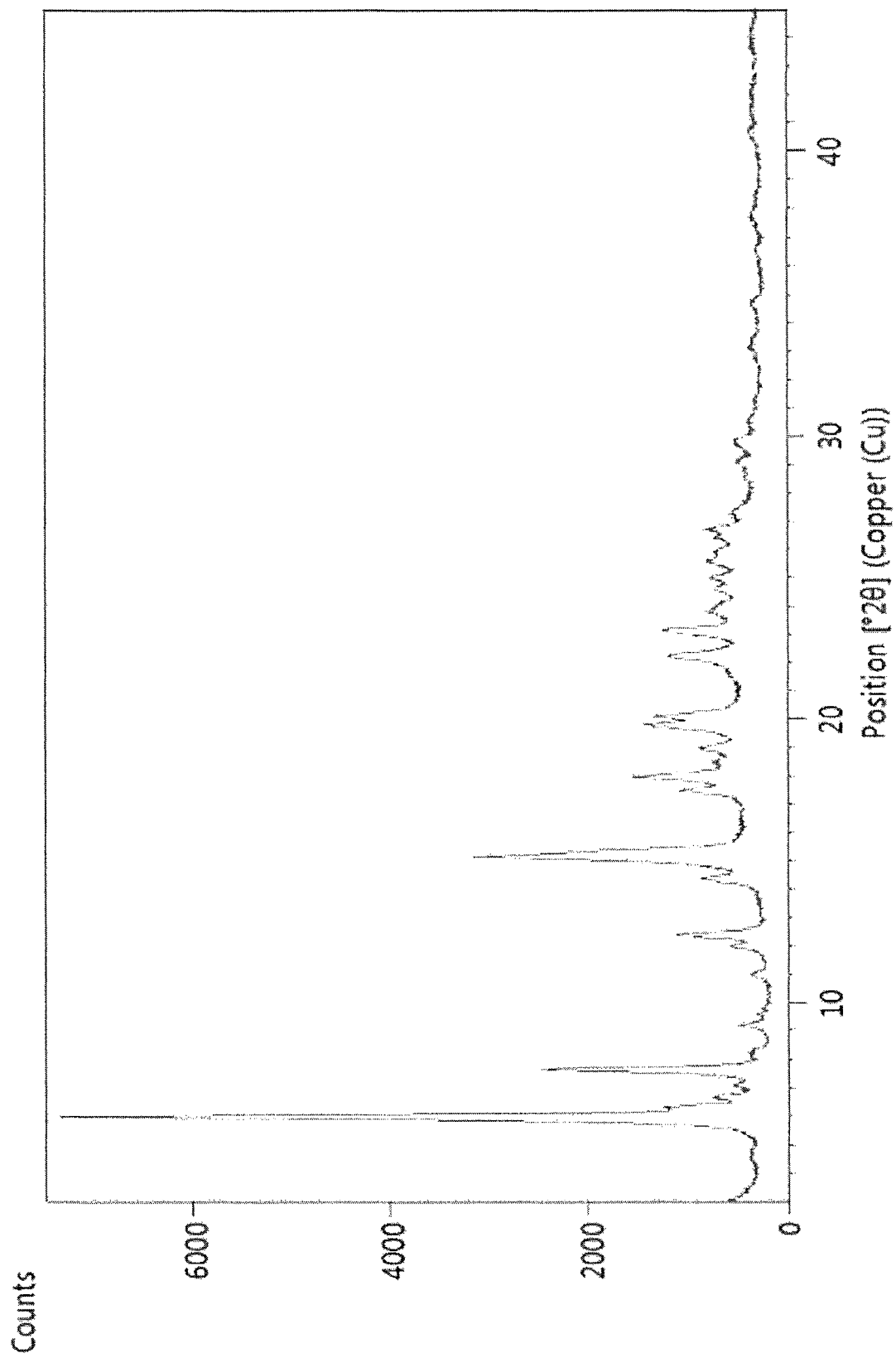
FIG. 11 is the characteristic powder X-ray diffraction (XRD) pattern of crystalline bictegravir zinc.

In accordance with another embodiment, the present invention provides crystalline bictegravir zinc characterized by a powder X-ray diffraction (PXRD) pattern substantially in accordance with FIG. 11.

In accordance with another embodiment, the present invention provides crystalline bictegravir zinc characterized by X-Ray diffraction (XRD) pattern having one or more peaks at about 4.6, 6.0, 6.3, 6.7, 7.1, 7.6, 8.3, 9.2, 9.6, 10.9, 12.0, 12.4, 14.4, 15.1, 15.4, 17.5, 18.0, 19.0, 19.8, 20.1, 22.3, 23.2, 23.8, 24.6, 25.0, 25.6, 26.0, 26.7, 27.3, 29.1, 29.9, 30.6 and 34.68±0.2° 2θ.

In accordance with another embodiment, the present invention provides a process for the preparation of bictegravir zinc, comprising:
   a) providing a solution of bictegravir and zinc source in a suitable organic solvent or a mixture thereof at ambient to reflux temperature,
   b) cooling the solution to below 30° C.; and
   c) isolating bictegravir zinc.

The suitable organic solvent used in step a) includes but is not limited to alcohols, ketones, amides, nitriles, ethers, halogenated hydrocarbons, aromatic hydrocarbons and mixtures thereof. The alcohols include, but are not limited to methanol, ethanol, isopropanol, butanol and the like; ketones include, but are not limited to acetone, methyl isobutyl ketone, methyl ethyl ketone and the like; amides includes dimethyl formamide, dimethyl acetamide, N-methyl pyyrolidine and the like; nitriles include, but are not limited to acetonitrile, propionitrile and the like; ethers include, but are not limited to tetrahydrofuran, dimethyl ether, diisopropyl ether, methyl tertiary butyl ether, 1,4-dioxane and the like; halogenated hydrocarbons include, but are not limited to methylene chloride, ethylene chloride, chloroform and the like; aromatic hydrocarbons include, but are not limited to toluene, xylene and the like; water and mixtures thereof; preferably N-methyl pyyrolidine, tetrahydrofuran and mixture thereof.

The zinc source may be selected from zinc chloride, zinc bromide, zinc hydroxide, zinc acetate, zinc sulfate and the like; preferably zinc chloride.

The step a) may be heated to about 50° C. to about reflux temperature to obtain a clear solution. Then, the resultant reaction solution can be cooled to below room temperature and stirring the reaction mass for sufficient period of time to precipitate bictegravir zinc. Then the bictegravir zinc can be recovered by any conventional techniques known in the art, for example filtration. The resultant product may be further dried at suitable temperatures preferably at above room temperature under vacuum.

Figure 12:
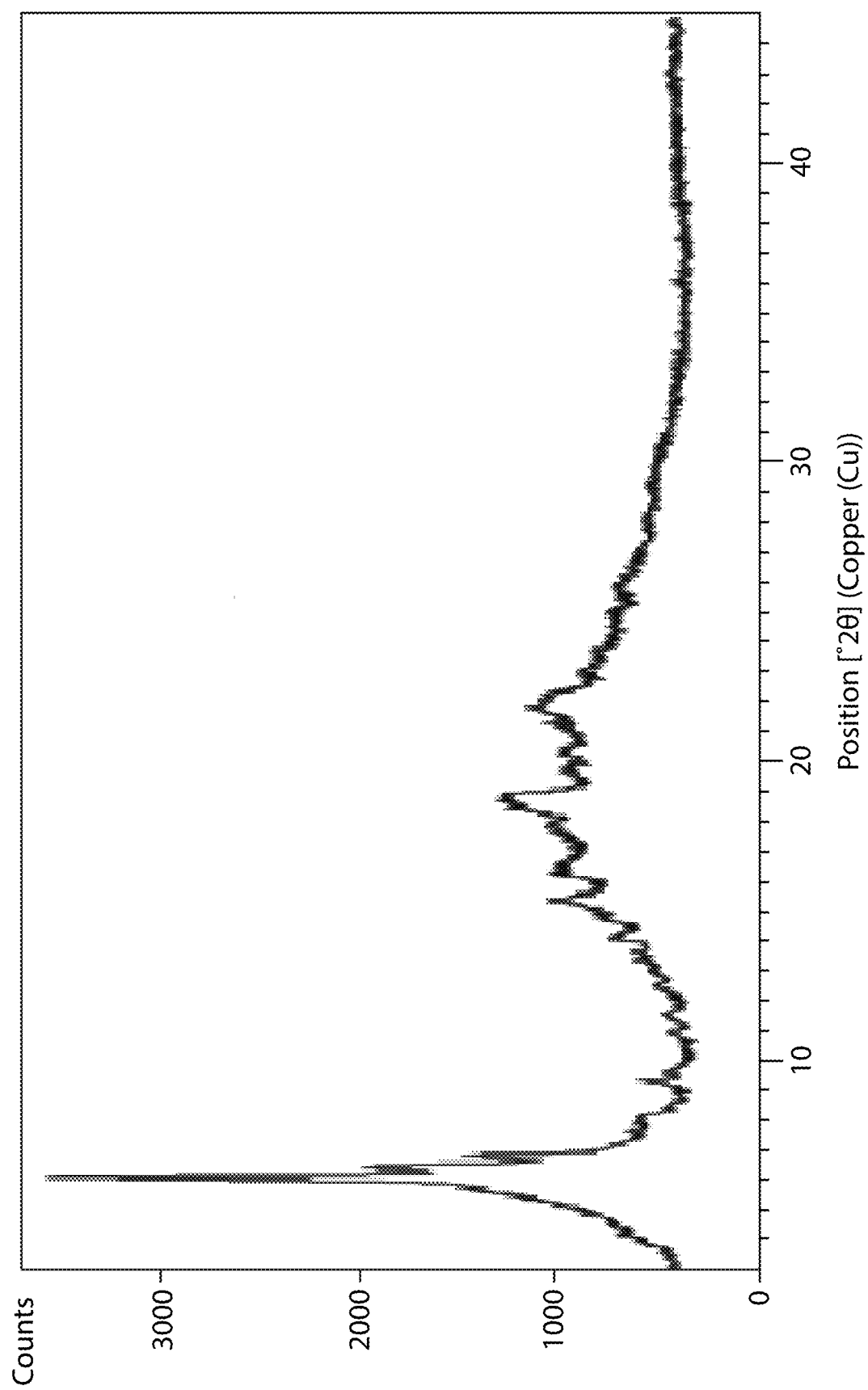
FIG. 12 is the characteristic powder X-ray diffraction (XRD) pattern of amorphous bictegravir zinc.

In accordance with another embodiment, the present invention provides amorphous bictegravir zinc characterized by a powder X-ray diffraction (PXRD) pattern substantially in accordance with FIG. 12.

In accordance with another embodiment, the present invention provides a process for the preparation of amorphous form of bictegravir zinc, comprising:
   a) suspending or dissolving bictegravir zinc in a suitable organic solvent at ambient to reflux temperature,
   b) stirring the step a) suspension or solution for a period of about 10 minutes to 6 hours,
   c) cooling the suspension or solution to below 30° C.; and
   d) isolating the amorphous form of bictegravir zinc.

Step a) of aforementioned process involves suspending or dissolving bictegravir zinc in suitable organic solvent such as water at ambient to reflux temperature, preferably 40° C. to 45° C. and then the resultant suspension or solution is stirred for a period of about 1 hour. Then cooling the suspension or solution to below 30° C., preferably at 20-25° C. and filtering the amorphous bictegravir zinc and followed by drying at about 50-55° C.

In accordance with another embodiment, the present invention provides bictegravir calcium.

In accordance with another embodiment, the present invention provides bictegravir calcium is either amorphous or crystalline in nature.

Figure 13:
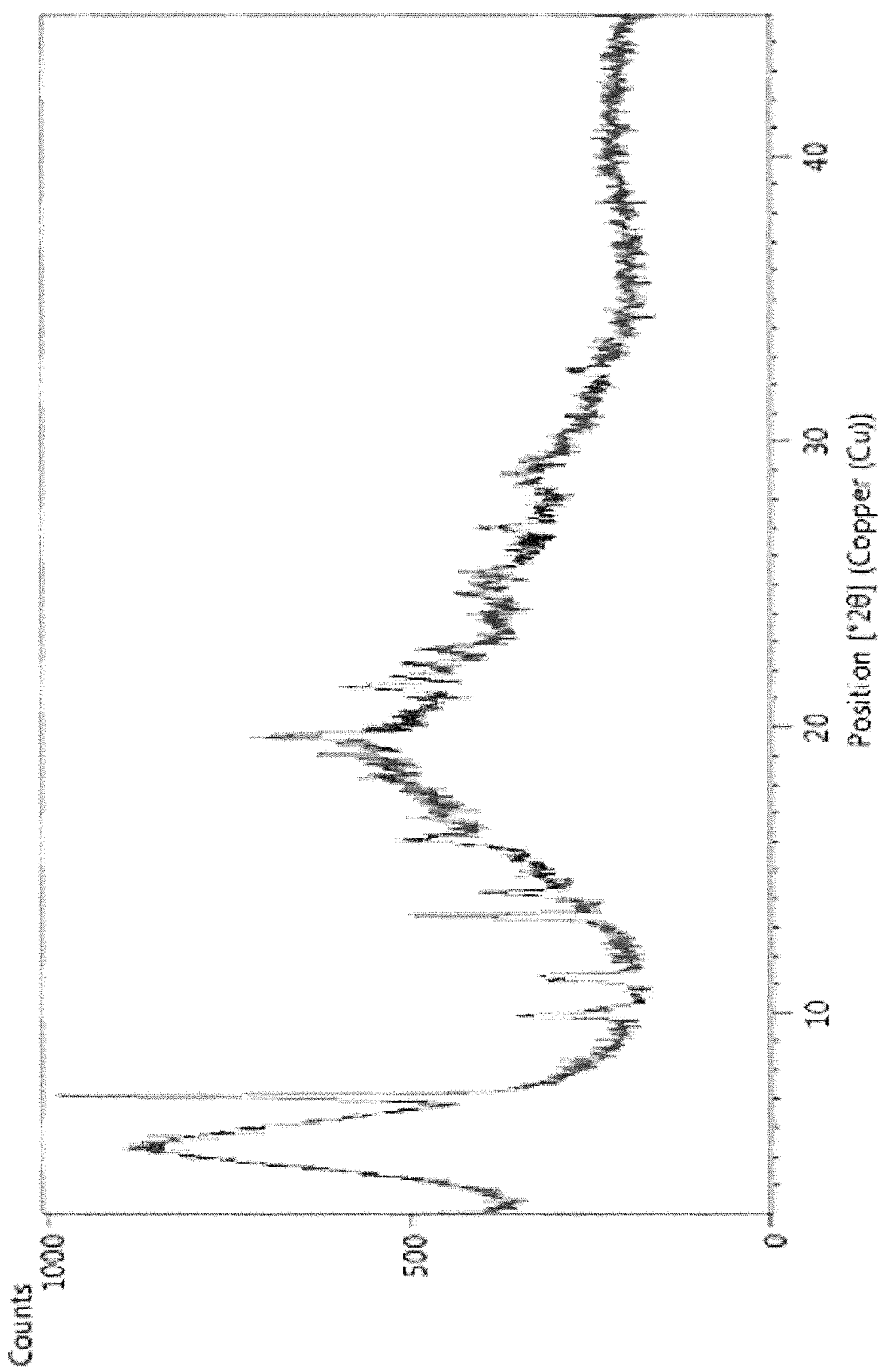
FIG. 13 is the characteristic powder X-ray diffraction (XRD) pattern of crystalline bictegravir calcium.

In accordance with another embodiment, the present invention provides crystalline bictegravir calcium characterized by a powder X-ray diffraction (PXRD) pattern substantially in accordance with FIG. 13.

In accordance with another embodiment, the present invention provides crystalline bictegravir calcium characterized by X-Ray diffraction (XRD) pattern having one or more peaks at about 5.2, 7.1, 9.9, 11.2, 11.3, 13.4, 14.2, 16.0, 16.8, 19.0, 19.6, 21.4, 21.8, 22.2, 22.8, 24.6, 25.5, 27.0 and 32.4±0.2° 2θ.

In accordance with another embodiment, the present invention provides a process for the preparation of bictegravir calcium, comprising:
a) providing a solution of bictegravir and calcium source in a suitable organic solvent or a mixture thereof at ambient to reflux temperature,
b) cooling the solution to below 30° C.; and
c) isolating bictegravir calcium.

The suitable organic solvent used in step a) includes but is not limited to alcohols, ketones, amides, nitriles, ethers, halogenated hydrocarbons, aromatic hydrocarbons and mixtures thereof. The alcohols include, but are not limited to methanol, ethanol, isopropanol, butanol and the like; ketones include, but are not limited to acetone, methyl isobutyl ketone, methyl ethyl ketone and the like; amides includes dimethyl formamide, dimethyl acetamide, N-methyl pyyrolidine and the like; nitriles include, but are not limited to acetonitrile, propionitrile and the like; ethers include, but are not limited to tetrahydrofuran, dimethyl ether, diisopropyl ether, methyl tertiary butyl ether, 1,4-dioxane and the like; halogenated hydrocarbons include, but are not limited to methylene chloride, ethylene chloride, chloroform and the like; aromatic hydrocarbons include, but are not limited to toluene, xylene and the like; water and mixtures thereof; preferably N-methyl pyrrolidine, water and mixture thereof.

The calcium source may be selected from calcium chloride, calcium bromide, calcium hydroxide, calcium acetate, calcium sulfate and the like; preferably calcium chloride.

The step a) may be heated to about 50° C. to about reflux temperature to obtain a clear solution. Then, the resultant reaction solution can be cooled to below room temperature and stirring the reaction mass for sufficient period of time to precipitate bictegravir calcium. Then the bictegravir calcium can be recovered by any conventional techniques known in the art, for example filtration. The resultant product may be further dried at suitable temperatures preferably at above room temperature under vacuum.

Figure 14:
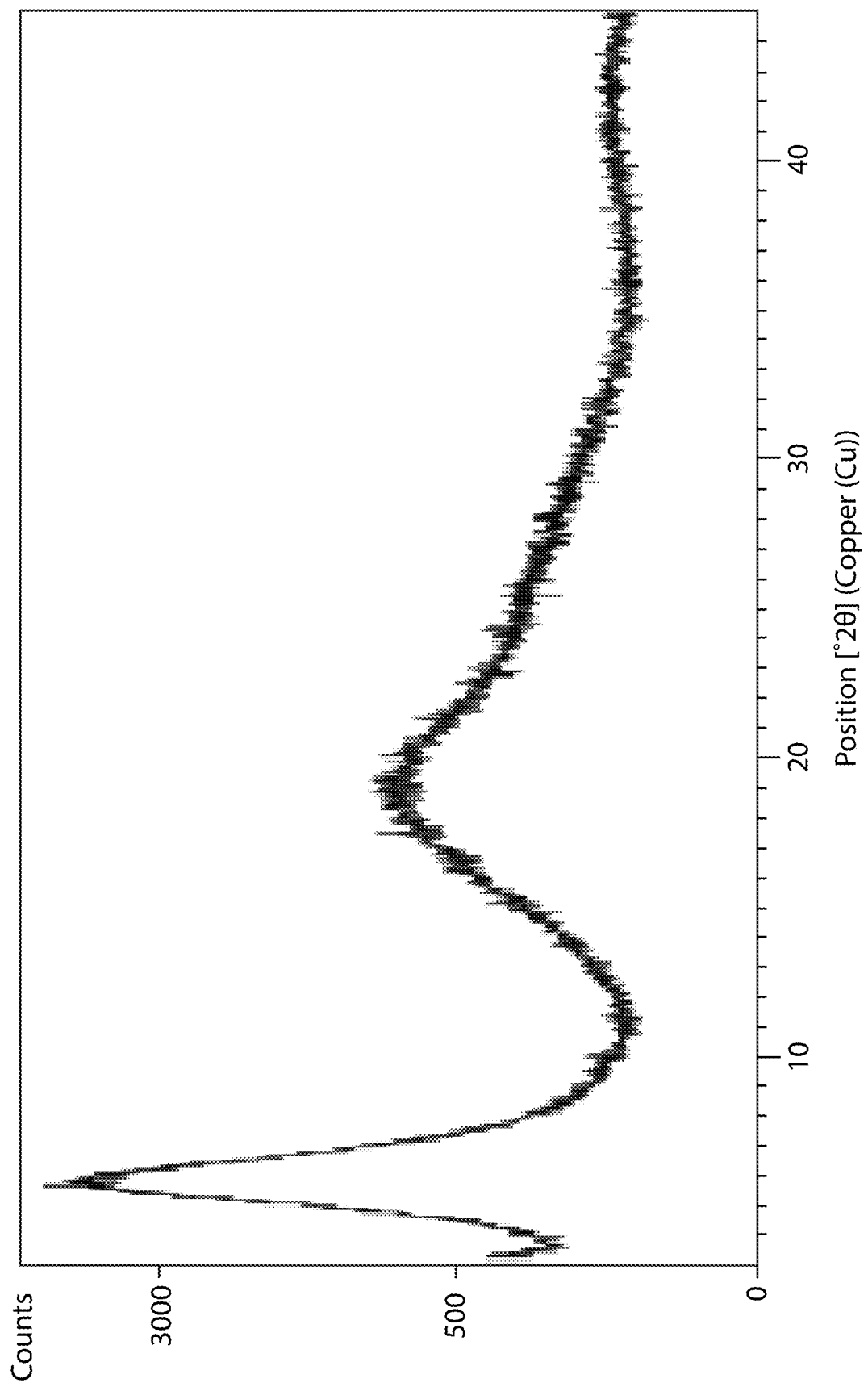
FIG. 14 is the characteristic powder X-ray diffraction (XRD) pattern of amorphous bictegravir calcium.

In accordance with another embodiment, the present invention provides amorphous bictegravir calcium characterized by a powder X-ray diffraction (PXRD) pattern substantially in accordance with FIG. 14.

In accordance with another embodiment, the present invention provides a process for the preparation of amorphous form of bictegravir calcium, comprising:
a) suspending or dissolving bictegravir calcium in a suitable organic solvent at ambient to reflux temperature,
b) stirring the step a) suspension or solution for a period of about 10 minutes to 6 hours,
c) cooling the suspension or solution to below 30° C.; and
d) isolating the amorphous form of bictegravir calcium.

Step a) of aforementioned process involves suspending or dissolving bictegravir calcium in suitable organic solvent such as methanol at ambient to reflux temperature, preferably 40° C. to 45° C. and then the resultant suspension or solution is stirred for a period of about 1 hour. Then cooling the suspension or solution to below 30° C., preferably at 20-25° C. and filtering the amorphous bictegravir calcium and followed by drying at about 50-55° C.

In accordance with another embodiment, the present invention provides a process for preparation of bictegravir of Formula I:

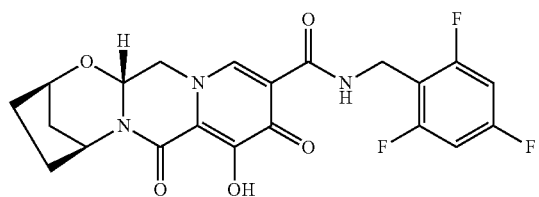

Formula I comprising:
a) reacting a compound of Formula II with a compound of Formula III in presence of a suitable activation agent and a suitable base in a suitable solvent to obtain a compound of Formula IV, and

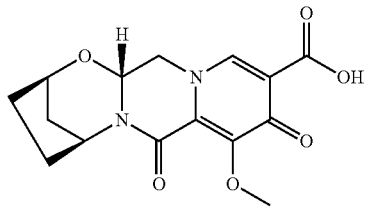

Formula II

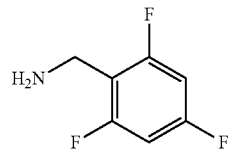

Formula III

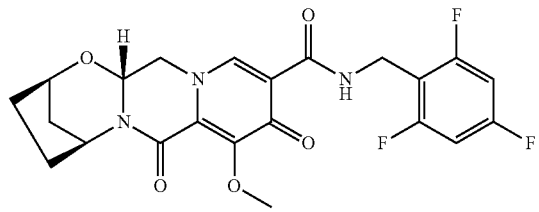

Formula IV b) demethylating the compound of Formula IV in presence of a suitable deprotecting agent to obtain bictegravir of Formula I;

wherein the suitable activation agent is selected from the group comprising 2-chloro-4,6-dimethoxy-1,3,5-triazine, carbonyldiimidazole (CDI), 1-ethyl-3-(3-dimethylaminopropyl)carbodiimide hydrochloride (EDC·HCl), 1-Hydroxybenzotriazole (HOBt), 3-[bis(dimethylamino)methyliumyl]-3H-benzotriazol-1-oxide hexafluorophosphate (HBTU), O-(1H-6-Chlorobenzotriazole-1-yl)-1,1,3,3-tetramethyluronium hexafluorophosphate (HCTU), O-(benzotriazol-1-yl)-N,N,N',N'-tetramethyluronium tetrafluoroborate (TBTU), propylphosphonic anhydride ($T_3P$), dicyclohexylcarbodiimide (DCC), 3-hydroxytriazolo[4,5-b]pyridine (HOAT), thionyl chloride ($SOCl_2$), oxalyl chloride ($COCl_2$), phosphorus oxychloride ($POCl_3$), pivaloyl chloride (PivCl), acetic anhydride ($Ac_2O$), N-ethoxycarbonyl-2-ethoxy-1,2-dihydroquinoline (EEQD), Methanesulfonyl chloride (MsCl) and p-toluenesulfonyl chloride (TsCl) and the like and mixture thereof.

In accordance with another embodiment, the present invention provides a process for preparation of bictegravir of Formula I with diastereomer impurity less than 0.15% by HPLC, comprising:

a) reacting a compound of Formula II with a compound of Formula III in presence of a suitable activation agent and a suitable base in a suitable solvent to obtain a compound of Formula IV, b) demethylating the compound of Formula IV in presence of a suitable deprotecting agent to obtain bictegravir of Formula I, c) suspending or dissolving bictegravir of Formula I in a suitable solvent selected from the group comprising alcohols, esters, halogenated hydrocarbons or mixture thereof at ambient to reflux temperature, d) separating the diastereomer impurity from step c) suspension or solution, and e) isolating the bictegravir of Formula I with diastereomer impurity less than 0.15% by HPLC;

wherein the suitable activation agent is selected from the group comprising 2-chloro-4,6-dimethoxy-1,3,5-triazine, carbonyldiimidazole (CDI), 1-ethyl-3-(3-dimethylaminopropyl)carbodiimide hydrochloride (EDC·HCl), 1-Hydroxybenzotriazole (HOBt), 3-[bis(dimethylamino)methyliumyl]-3H-benzotriazol-1-oxide hexafluorophosphate (HBTU), O-(1H-6-Chlorobenzotriazole-1-yl)-1,1,3,3-tetramethyluronium hexafluorophosphate (HCTU), O-(benzotriazol-1-yl)-N,N,N',N'-tetramethyluronium tetrafluoroborate (TBTU), propylphosphonic anhydride ($T_3P$), dicyclohexylcarbodiimide (DCC), 3-hydroxytriazolo[4,5-b]pyridine (HOAT), thionyl chloride ($SOCl_2$), oxalyl chloride ($COCl_2$), phosphorus oxychloride ($POCl_3$), pivaloyl chloride (PivCl), acetic anhydride ($Ac_2O$), N-ethoxycarbonyl-2-ethoxy-1,2-dihydroquinoline (EEQD), Methanesulfonyl chloride (MsCl) and p-toluenesulfonyl chloride (TsCl) and the like and mixture thereof.

The starting materials, a compound of Formula II and Formula III are known in the art and can be produced by methods known and recognized by the organic chemist of ordinary skill in the art, for example WO2014/100323 and U.S. Pat. No. 6,452,056.

The step a) of forgoing process involves reaction of a compound of Formula II with a compound of Formula III in presence of a suitable activation agent and a suitable base in a suitable solvent to obtain a compound of Formula IV.

The suitable activation agent for reaction of a compound of Formula II with a compound of Formula III is selected from the group comprising 2-chloro-4,6-dimethoxy-1,3,5-triazine, carbonyldiimidazole (CDI), 1-ethyl-3-(3-dimethylaminopropyl)carbodiimide hydrochloride (EDC·HCl), 1-Hhydroxybenzotriazole (HOBt), 3-[bis(dimethyl amino)methyliumyl]-3H-benzotriazol-1-oxide hexafluorophosphate (HBTU), O-(1H-6-Chlorobenzotriazole-1-yl)-1,1,3,3-tetramethyluronium hexafluorophosphate (HCTU), O-(benzotriazol-1-yl)-N,N,N',N'-tetramethyluronium tetrafluoroborate (TBTU), propylphosphonic anhydride ($T_3P$), dicyclohexylcarbodiimide (DCC), 3-hydroxy triazolo[4,5-b]pyridine (HOAT), thionyl chloride ($SOCl_2$), oxalyl chloride ($COCl_2$), phosphorus oxychloride ($POCl_3$), pivaloyl chloride (PivCl), acetic anhydride ($Ac_2O$), N-ethoxycarbonyl-2-ethoxy-1,2-dihydroquinoline (EEQD), Methanesulfonyl chloride (MsCl) and p-toluenesulfonyl chloride (TsCl) and the like and mixture thereof; preferably pivaloyl chloride.

The suitable base used herein step a) is selected from either inorganic base or organic base; further, the suitable inorganic base is selected from, but is not limited to, alkali metal hydroxides such as sodium hydroxide, potassium hydroxide and the like; alkali metal hydrides such as sodium hydride, potassium hydride and the like; alkali metal amides such as sodium amide, potassium amide, lithium amide and the like; alkali metal alkoxides such as sodium methoxide, sodium ethoxide, sodium t-butoxide, potassium t-butoxide and the like; alkali metal carbonates such as sodium carbonate, potassium carbonate, cesium carbonate and the like; alkali metal bicarbonates such as sodium bicarbonate, potassium bicarbonate and the like; phosphates such as sodium phosphate, trisodium phosphate, potassium phosphate, tripotassium phosphate and the like; ammonium carbonate; and the organic base is selected from, but is not limited to, triethylamine, tri-n-propylamine, tri-n-butylamine, methyldibutylamine, diisopropylamine, dicyclohexylamine, methyl dicyclohexylamine, diisopropyl ethylamine, N,N-diethyldicyclohexylamine, pyridine, dimethylamino-4-pyridine, N-methyl piperidine, N-ethylpiperidine, N-ethylpiperidine, N-butylpiperidine, 1,2-dimethyl piperidine and the like and mixtures thereof. Preferably the suitable base is sodium hydroxide, potassium hydroxide, sodium amide, sodium methoxide, sodium ethoxide, sodium t-butoxide, potassium t-butoxide, sodium carbonate, potassium carbonate, cesium carbonate, sodium bicarbonate, potassium bicarbonate, triethylamine, diisopropylamine, diisopropyl ethylamine, N-methyl piperidine, N-ethylpiperidine and mixtures thereof; more preferably diisopropylethylamine.

The suitable solvent used herein in step a) is selected from, but is not limited to ketones, esters, nitriles, ethers, halogenated hydrocarbons, aromatic hydrocarbons, polar aprotic solvent, water and mixtures thereof. The ketones include, but are not limited to acetone, methyl isobutyl ketone, methyl ethyl ketone and the like; esters include, but are not limited to ethylacetate, isopropyl acetate, butyl acetate and the like; nitriles include, but are not limited to acetonitrile, propionitrile and the like; ethers include, but are not limited to tetrahydrofuran, dimethyl ether, diisopropyl ether, methyl tertiary butyl ether, 1,4-dioxane and the like; halogenated hydrocarbons include, but are not limited to methylene chloride, ethylene chloride, chloroform and the like; aromatic hydrocarbons include, but are not limited to toluene, xylene and the like; polar aprotic solvent include, but are not limited to dimethylacetamide, dimethylformamide, dimethylsulfoxide, N-methylpyrrolidone and the like and mixtures thereof; preferably methylene chloride.

The reaction of a Formula II with a compound of Formula III is carried out at a temperature of about 10° C. to reflux temperature; preferably at about 20° C. to about 35° C. for a period of time from about 30 min to until completion of the reaction.

The step b) of forgoing process involves demethylation of the compound of Formula IV in presence of a suitable deprotecting agent to obtain bictegravir of Formula I.

The suitable deprotecting agent for demethylation of the compound of Formula IV is selected from the group comprising magnesium chloride, magnesium bromide, magnesium iodide, magnesium hydroxide, lithium chloride, lithium bromide, lithium iodide, lithium hydroxide, lithium trisiamyl borohydride, lithium triethyl borohydride, tri-sec-butyl borohydride, boron tribromide, aluminium chloride-triethylamine complex, aluminium chloride-N,N-dimethyl aniline complex and the like and mixture thereof; preferably lithium chloride.

The demethylation of the compound of Formula IV in presence of a suitable deprotecting agent may be advantageously carried out in a suitable solvent. The suitable solvent includes but is not limited to polar aprotic solvents and polar protic solvents and the like and mixture thereof. The polar aprotic solvents include, but are not limited to methylene chloride, N-methylpyrrolidone, tetrahydrofuran, dimethylformamide, acetonitrile, dimethylsulfoxide and the like and mixtures thereof. The polar protic solvents include, but are not limited to methanol, ethanol, formic acid, acetic acid and the like and mixtures thereof; preferably N-methylpyrrolidone.

The demethylation of the compound of Formula IV in presence of a suitable deprotecting agent is carried out at a temperature of about 25° C. to reflux temperature for a period of time from about 30 min to until completion of the reaction.

The present invention provides bictegravir of Formula I prepared by the process described as above having a purity of at least about 95%, as measured by HPLC, preferably at least about 97% as measured by HPLC; and content of diastereomer impurity is about 5%, as measured by HPLC, more preferably is about 3% as measured by HPLC.

Acid-amine coupling step involves formation of diastereomer impurity about 3% by HPLC and which is carry forward to next demethylation step also. The diastereomer impurity once formed is very difficult to separate from the product due to less polarity difference with the product. Each diastereomers of a single product are having different activity. Hence without diastereomeric purity the API is not suitable for final formulation.

Hence, it is an object of the present invention to provide a process for the purification of bictegravir using a suitable solvent. The present inventors have surprisingly found that the diastereomer impurity can be separated from the product by the purification process. The purification process of the present invention involves suspending or dissolving the bictegravir having diastereomer impurity in a suitable solvent and separating the undissolved diastereomer impurity from the solution containing desired product to obtain bictegravir with diastereomer impurity less than 0.15% by HPLC.

In accordance with another embodiment, the present invention provides a process for purification of bictegravir of Formula I, comprising:
a) suspending or dissolving bictegravir of Formula I in a suitable solvent
b) separating the undissolved solids from the step a) suspension or solution, and
c) isolating the bictegravir of Formula I.

In accordance with another embodiment, the present invention provides a process for purification of bictegravir of Formula I, comprising:
a) suspending or dissolving bictegravir of Formula I in a suitable solvent
b) separating the undissolved solids from the step a) suspension or solution, and
c) isolating the bictegravir of Formula I; wherein the suitable solvent is selected from the group comprising alcohols, esters, halogenated hydrocarbons or mixture thereof.

In accordance with a specific embodiment, the present invention provides a process for purification of bictegravir of Formula I with diastereomer impurity less than 0.15% by HPLC, comprising:
a) suspending or dissolving bictegravir of Formula I with diastereomer impurity more than 0.15% by HPLC in a suitable solvent at ambient to reflux temperature,
b) separating the diastereomer impurity from step a) suspension or solution, and
c) isolating the bictegravir of Formula I with diastereomer impurity less than 0.15% by HPLC.

The starting bictegravir with diastereomer impurity more than 0.15% by HPLC can be obtained as per procedure of the present invention as described just as above.

Formation of suspension or solution of bictegravir of Formula I with diastereomer impurity more than 0.15% by HPLC in a suitable solvent is selected from the group comprising alcohols, esters, halogenated hydrocarbons or mixture thereof at a temperature of at ambient to reflux temperature; preferably at about 25° C. to about 30° C. The alcohols include, but are not limited to methanol, ethanol, isopropanol, n-propanol, tert-butanol and the like; esters include, but are not limited to ethyl acetate, isopropyl acetate, isobutyl acetate and the like; halogenated hydrocarbons include, but are not limited to methylene chloride, ethylene chloride and the like and mixture thereof; preferably methanol, tert-butanol, ethyl acetate, methylene chloride and mixture thereof.

Then separating the material (diastereomer impurity) from step a) suspension or solution by conventional techniques, for example filtration or decantation. The filtrate containing bictegravir of Formula I with diastereomer impurity less than 0.15% by HPLC is isolated by conventional techniques, for example evaporation, precipitation by cooling or by adding an anti-solvent and the resultant product may be separated and optionally be further dried.

In accordance with another embodiment, bictegravir obtained by the processes described as above, having purity of at least about 99% as measured by HPLC, preferably at least about 99.9% as measured by HPLC and substantially free of diastereomer impurity; wherein the word "substantially free" refers to bictegravir having less than 0.15% of diastereomer impurity as measured by HPLC, preferably less than about 0.1% of diastereomer impurity as measured by HPLC; more preferably less than about 0.05% of diastereomer impurity as measured by HPLC.

In another embodiment, the present invention provides a pharmaceutical composition comprising bictegravir, its salts, co-crystals, solvates or hydrates thereof prepared by the processes of the present invention and at least one pharmaceutically acceptable excipient.

The present invention provides bictegravir, obtained by the above process, as analyzed using high performance liquid chromatography ("HPLC") with the conditions are tabulated below:

| | |
|---|---|
| Column | Zorbax SB C8 (150 × 4.6) mm, 3.5 μm |
| Mobile phase | A: Orthophosphoric acid solution<br>B: Mixture of acetonitrile, methanol and tetrahydrofuran |
| Flow rate | 1.2 mL/min |
| Elution | Gradient |
| Detection | By UV at 250 nm |
| Injection volume | 20 μL |
| Run time | 90 min |

| Mode | Time in min | Mobile phase A (% v/v) | Mobile phase B (% v/v) |
|---|---|---|---|
| | 0 | 82 | 18 |
| | 5 | 82 | 18 |
| | 40 | 65 | 35 |
| | 80 | 20 | 80 |
| | 82 | 82 | 18 |
| | 90 | 82 | 18 |

EXAMPLES

The following non limiting examples illustrate specific embodiments of the present invention. They are not intended to be limiting the scope of the present invention in any way.

Example-1: Preparation of Bictegravir Sodium Form-L

Bictegravir (10 gm), methylene chloride (60 mL) were added in to a round bottom flask at 20-25° C. and stirred for 5 min at same temperature. Reaction mass was cool to −10° C. to −15° C. Then the solution was added to a pre cooled solution of methanolic sodium hydroxide (1.82 gm NaOH was dissolved in 250 mL methanol) at −10° C. to −15° C. over a period of 2 min and allowed to stir for 1 hr at same temperature. Solid was filtered and washed with chilled methanol (10 mL), suck dried the solid for 15 min and dried the wet material under vacuum at room temperature for about 1 hr and at 50-55° C. for 14 hrs to obtain the title compound. Wt: 10.47 gm. The PXRD is set forth in FIG. 1.

Example-2: Preparation of Bictegravir Sodium Form-L

Bictegravir (10 gm), methylene chloride (100 mL) were added in to a round bottom flask at 20-25° C. and stirred for 5 min at same temperature. Reaction mass was cool to 1° C. to 5° C. Then the solution was added to a pre cooled solution of methanolic sodium hydroxide (1.8 gm NaOH was dissolved in 150 mL methanol) at cool to 1° C. to 5° C. over a period of 15 min and allowed to stir for 1 hr at same temperature. Solid was filtered and washed with chilled methanol (10 mL), suck dried the solid for 15 min and dried the wet material under vacuum at room temperature for about 2 hr and at 50-55° C. for 12 hrs to obtain the title compound. Wt: 10.5 gm. The PXRD is set forth in FIG. 1.

Example-3: Preparation of Bictegravir Sodium Form-L

Bictegravir (10 gm), methylene chloride (50 mL) were added in to a round bottom flask at 20-25° C. and stirred for 5 min at same temperature. Reaction mass was cool to 1° C. to 5° C. Then the solution was added to a pre cooled solution of methanolic sodium hydroxide (1.81 gm NaOH was dissolved in 250 mL methanol) at cool to 1° C. to 5° C. over a period of 20 min and allowed to stir for 1 hr at same temperature. Solid was filtered and washed with chilled methanol (10 mL), suck dried the solid for 15 min and dried the wet material under vacuum at room temperature for about 2 hr and at 50-55° C. for 12 hrs to obtain the title compound. Wt: 10.5 gm. The PXRD is set forth in FIG. 1.

Example-4: Preparation of Bictegravir Sodium Form-L

Bictegravir (10 gm), methylene chloride (50 mL) were added in to a round bottom flask at 20-25° C. and stirred for 5 min at same temperature. Reaction mass was cool to 1° C. to 5° C. Then the solution was added to a pre cooled solution of methanolic sodium hydroxide (1.8 gm NaOH was dissolved in 22.2 mL water and 150 mL methanol) at cool to 1° C. to 5° C. over a period of 20 min and allowed to stir for 1 hr at same temperature. Solid was filtered and washed with chilled methanol (10 mL), suck dried the solid for 15 min and dried the wet material under vacuum at 50-55° C. for 12 hrs to obtain the title compound. Wt: 9.81 gm. The PXRD is set forth in FIG. 1.

Example-5: Preparation of Bictegravir Sodium Form-L

Bictegravir (500 mg), 2,2,2-trifluoroethanol (1 mL) were added in to a round bottom flask and heated to about 60° C. to about 65° C. and stirred for 5 min at same temperature. Reaction mass was cool to −8° C. to −12° C. Then the solution was added to a pre cooled solution of methanolic sodium hydroxide (99.1 mg NaOH was dissolved in 5 mL methanol) at −8° C. to −12° C. and allowed to stir for 30 min at same temperature. Solid was filtered and suck dried the solid for 15 min and dried the wet material under vacuum at 50-55° C. for 12 hrs to obtain the title compound. The PXRD is set forth in FIG. 1.

Example-6: Preparation of Bictegravir Sodium Form-L1

Bictegravir (2 gm), isopentanol (40 mL) and acetonitrile (12 mL) were added in to a round bottom flask at 20-25° C. and stirred for 5 min at same temperature. Reaction mass was cool to 1-5° C. To the reaction mass was added aqueous sodium hydroxide (196.6 mg NaOH was dissolved in 2.45 mL) at 1-5° C. and allowed to stir for 1 hr at same temperature. Solid was filtered and washed with isopentanol (5 mL), suck dried the solid for 15 min and dried the wet material under vacuum at room temperature for about 6 hrs to obtain the title compound. Wt: 1.92 gm. The PXRD is set forth in FIG. 2; DSC endotherm peaks at 115.6° C. and 155.8° C.; TGA weight loss: 0.12%; and Isopentanol content (%) by $^1$H-NMR: 16.6%.

Example-7: Preparation of Bictegravir Sodium Form-L2

Bictegravir sodium Form-L1 (1.6 gm) was dried under vacuum at 85-90° C. for about 10 hrs to obtain the title compound. Wt: 1.4 gm. The PXRD is set forth in FIG. 3; DSC endotherm peaks at 57.8° C.; TGA weight loss: 0.53%; Isopentanol content (%) by $^1$H-NMR: 0.5%; and Moisture Content: 1.6%.

Example-8: Preparation of Bictegravir Sodium Form-L2

Bictegravir (10 gm), isopentanol (200 mL) and acetonitrile (60 mL) were added in to a round bottom flask at 20-25°

C. Reaction mass was cool to 1-5° C. and stir for 5 min at same temperature. To the reaction mass was added aqueous sodium hydroxide (980 mg NaOH was dissolved in 4.9 mL) at 1-5° C. and allowed to stir for 1 hr at same temperature. Solid was filtered and washed with isopentanol (20 mL), suck dried the solid for 1 hr, dried under vacuum at room temperature for 8 hrs and further dried under vacuum at 85-90° C. for about 24 hrs to obtain the title compound. Wt: 9.6 gm. Isopentanol content (%) by $^1$H-NMR: 0.3%; and Moisture Content: 0.9%.

Example-9: Preparation of Bictegravir Sodium Form-L2

Bictegravir (10 gm), isopentanol (200 mL) and acetonitrile (60 mL) were added in to a round bottom flask at 20-25° C. Reaction mass was heated to 55-60° C. and allowed to cool to 1-5° C. and stir for 5 min at same temperature. To the reaction mass was added aqueous sodium hydroxide (980 mg NaOH was dissolved in 4.9 mL water) at 1-5° C. and allowed to stir for 1 hr at same temperature. Solid was filtered and washed with isopentanol (10 mL), suck dried the solid for 40 min, dried under vacuum at room temperature for 6 hrs and further dried under vacuum at 85-90° C. for about 21 hrs to obtain the title compound. Wt: 9.3 gm. Isopentanol content (%) by $^1$H-NMR: 0.5%; and Moisture Content: 1.2%.

Example-10: Preparation of Bictegravir Sodium Form-L3

Bictegravir (1.0 gm) and n-butanol (20 mL) were added in to a round bottom flask at 20-25° C. and stir for 5 min at same temperature. Reaction mass was cool to 1-5° C. and was added aqueous sodium hydroxide (98 mg NaOH was dissolved in 1.23 mL water) at 1-5° C. and allowed to stir for 2 hr at same temperature. Solid was filtered and washed with n-butanol (2 mL), suck dried the solid for 20 min and dried the wet material under vacuum at room temperature for about 22 hrs to obtain the title compound. Wt: 1.1 gm. The PXRD is set forth in FIG. 4; DSC endotherm peaks at 181.5° C. and 232.4° C. & exotherm peak at 260.9° C.; TGA weight loss: 0.09%; and n-butanol content (%) by $^1$H-NMR: 14.7%.

Example-11: Preparation of Bictegravir Sodium Form-L4

Bictegravir (1.0 gm) and n-pentanol (20 mL) were added in to a round bottom flask at 20-25° C. and stir for 5 min at same temperature. Reaction mass was cool to 1-5° C. and was added aqueous sodium hydroxide (98.5 mg NaOH was dissolved in 1.23 mL water) at 1-5° C. and allowed to stir for 2 hr at same temperature. Solid was filtered and washed with n-pentanol (2 mL), suck dried the solid for 20 min and dried the wet material under vacuum at room temperature for about 22 hrs to obtain the title compound. Wt: 1.0 gm. The PXRD is set forth in FIG. 5; DSC endotherm peaks at 112.4° C., 187.4° C. and 235.2° C. & exotherm peak at 267.2° C.; TGA weight loss: 0.07%; and n-pentanol content (%) by $^1$H-NMR: 16.5%.

Example-12: Preparation of Bictegravir Sodium Form-L5

Bictegravir (1.0 gm) and n-propanol (20 mL) were added in to a round bottom flask at 20-25° C. and stir for 5 min at same temperature. Reaction mass was cool to 1-5° C. and was added aqueous sodium hydroxide (98.2 mg NaOH was dissolved in 1.23 mL water) at 1-5° C. and allowed to stir for 2 hr at same temperature. Solid was filtered and washed with n-propanol (2 mL), suck dried the solid for 25 min and dried the wet material under vacuum at room temperature for about 22 hrs to obtain the title compound. Wt: 1.1 gm. The PXRD is set forth in FIG. 6 and n-propanol content (%) by $^1$H-NMR: 1.9%.

Example-13: Preparation of Bictegravir Sodium Form-L6

Bictegravir (1.0 gm) and isobutanol (20 mL) were added in to a round bottom flask at 20-25° C. and stir for 5 min at same temperature. Reaction mass was cool to 1-5° C. and was added aqueous sodium hydroxide (97.9 mg NaOH was dissolved in 1.23 mL water) at 1-5° C. and allowed to stir for 2 hr at same temperature. Solid was filtered and washed with isobutanol (2 mL), suck dried the solid for 20 min and dried the wet material under vacuum at room temperature for about 22 hrs to obtain the title compound. Wt: 1.1 gm. The PXRD is set forth in FIG. 7 and isobutanol content (%) by $^1$H-NMR: 1.2%.

Example-14: Preparation of Bictegravir Diethylamine

To a 100 mL round bottom flask fitted with a mechanical stirrer, thermometer was charged bictegravir (5 g), diethylamine (1.7 g) and a mixture of methanol (50 mL) and tetrahydrofuran (5 mL) at 25° C. to 30° C. Reaction mass was heated to 60-65° C. for 1 hr at same temperature. Reaction mass was allowed to cool to room temperature and stir for 12 hrs at same temperature. The precipitated solid was filtered and dried the solid in an oven under vacuum to obtain title compound. Yield: 4.5 g; PXRD: FIG. 8; DSC endotherm peaks at 146.5° C., 180° C. and 213.6° C.

Example-15: Preparation of Bictegravir Tromethamine

To a 50 mL round bottom flask fitted with a mechanical stirrer, thermometer was charged bictegravir (1 g), tromethamine (300 mg) and methanol (10 mL) at 25° C. to 30° C. Reaction mass was heated to 60-65° C. for 1 hr at same temperature. Reaction mass was allowed to cool to −10° C. and stir for overnight at same temperature. The precipitated solid was filtered and dried the solid in an oven under vacuum at 50° C. to obtain title compound. Yield: 0.9 g; PXRD: FIG. 9.

Example-16: Preparation of Bictegravir Magnesium

To a 500 mL round bottom flask fitted with a mechanical stirrer, thermometer was charged bictegravir (20 g), magnesium hydroxide (5 g) and a mixture of methanol (100 mL) and water (40 mL) at 25° C. to 30° C. Reaction mass was heated to 60-65° C. for 1 hr at same temperature. Reaction mass was allowed to cool to room temperature and stir for overnight at same temperature. The precipitated solid was filtered and washed with methanol (40 mL), dried the solid in an oven under vacuum at 50° C. to obtain title compound. Yield: 23 g; PXRD: FIG. 10; DSC endothelia peak at 58.6° C.; TGA weight loss: 0.8%.

Example-17: Preparation of Bictegravir Zinc

To a 500 mL round bottom flask fitted with a mechanical stirrer, thermometer was charged compound of Formula IV (25 g), N-methyl pyrrolidine (160 mL) and lithium chloride (13.7 g) at 25° C. to 30° C. Reaction mass was heated to 60-65° C. for 12-14 hrs at same temperature. After completion of the reaction, reaction mass was allowed to cool to room temperature and was charged zinc chloride (40 mL; 2M solution in THF) and stir for 2 hrs at same temperature. Reaction mass was heated to 45-50° C. and solvent was removed under vacuum and was added water (125 mL). Reaction mass was allowed to cool to room temperature and stir for 6 hrs at same temperature. The precipitated solid was filtered and washed with water (2×50 mL), dried the solid in an oven under vacuum for about 10-12 hours to obtain title compound. Yield: 25 g; PXRD: FIG. 11; DSC endotherm peaks at 84.4° C. and 280.1° C.

Example-18: Preparation of Bictegravir Zinc

To a 50 mL round bottom flask fitted with a mechanical stirrer, thermometer was charged bictegravir zinc (1 g) and water (10 mL) at 40-45° C. and stir for 1 hr at the same temperature. The mixture was gradually cooled to about 20-25° C. and the precipitated solid was filtered and washed with water (4 mL) and dried at 50-55° C. under vacuum to obtain amorphous bictegravir zinc salt (1.0 g); PXRD: FIG. 12.

Example-19: Preparation of Bictegravir Calcium

To a 500 mL round bottom flask fitted with a mechanical stirrer, thermometer was charged compound of Formula IV (25 g), N-methyl pyrrolidine (160 mL) and lithium chloride (13.7 g) at 25° C. to 30° C. Reaction mass was heated to 60-65° C. for 12-14 hrs at same temperature. After completion of the reaction, reaction mixture was allowed to cool to room temperature and was charged aq. calcium chloride (8 g dissolved in 50 mL water) and stir for 2 hrs at same temperature. Reaction mass was heated to 45-50° C. and was added water (125 mL). Reaction mass was allowed to cool to room temperature and stir for 6 hrs at same temperature. The precipitated solid was filtered and washed with water (2×50 mL), dried the solid in an oven under vacuum at 40° C. to 45° C. for about 10-12 hours to obtain title compound. Yield: 25 g; PXRD: FIG. 13; DSC endotherm peaks at 79.7° C. and 207° C.; TGA weight loss: 5.4%.

Example-20: Preparation of Bictegravir Calcium

To a 50 mL round bottom flask fitted with a mechanical stirrer, thermometer was charged Bictegravir calcium (1.5 g) and water (7.5 mL) and heated to 40-45° C. and maintained for 1 hr at the same temperature. Then the reaction mass was gradually cooled to 20-25° C. and the precipitated solid was filtered off and washed with water (2 mL) and dried at 50-55° C. under vacuum to afford amorphous Bictegravir calcium salt (1.2 g); PXRD: FIG. 14.

Example-21: Preparation of bictegravir calcium

To a 50 mL round bottom flask fitted with a mechanical stirrer, thermometer was charged Bictegravir calcium (1.5 g) and methanol (7.5 mL) and heated to 40-45° C. and maintained for 1 hr at the same temperature. Then the reaction mass was gradually cooled to 20-25° C. and the precipitated solid was filtered off and washed with methanol (2 mL) and dried at 50-55° C. under vacuum to afford amorphous Bictegravir calcium salt (0.8 g); PXRD: FIG. 7.

Example-22: Preparation of Compound of Formula IV

To a 2 lit round bottom flask fitted with a mechanical stirrer, thermometer was charged compound of Formula II (100 g), methylene chloride (1 lit), diisopropylethylamine (109 mL) and pivaloyl chloride (42 g) at 25-30° C. and stir for 1 hr at same temperature. To the reaction mass was added a solution of compound of Formula III (55.5 g) in methylene chloride (50 mL) and diisopropylethylamine (54.6 mL) at 25-30° C. and stir for 2 hr at same temperature. After completion of reaction, reaction mass was washed with 10% aq. hydrochloric acid (500 mL), aq. sodium bicarbonate (500 mL) and aq. sodium chloride (200 mL) sequentially. The combined organic layer was dryed by azeotropic removal of water. To the reaction mass was added succinic acid (6.5 g) and 4-dimethylaminopyridine (11.5 g) and the reaction mass was heated to reflux for 4 hrs. After completion of the reaction, reaction mass temperature was allowed to cool to 20-25° C. and washed with aq. sodium bicarbonate (500 mL), 5% aq. hydrochloric acid (500 mL) and 10% aq. sodium chloride (500 mL) sequentially. Then the combined organic layer was concentrated and co-distilled with isopropanol (100 mL) to obtain residue. To the obtained residue was added isopropanol (300 mL) and the reaction mass was heated to reflux for 1 hr. Reaction mass temperature was allowed to cool to 20-25° C. and stir for 10 hrs at same temperature. The precipitated solid was filtered and washed with chilled isopropanol (50 mL), dried the solid in an oven under vacuum at 50-55° C. to obtain title compound. Yield: 110 g; Purity by HPLC: 97.8%; Diastereomer impurity: 2.12% by HPLC.

Example-23: Preparation of Bictegravir

To a 2 lit round bottom flask fitted with a mechanical stirrer, thermometer was charged compound of Formula IV (100 g), N-methylpyrrolidone (640 mL) and lithium chloride (55 g) were added one by one at 20-25° C. Reaction mass temperature was heated to 63° C. and stir for 14 hrs at same temperature. After completion of the reaction, reaction mass temperature was allowed to cool to 20-25° C. and was added 1M aq. hydrochloric acid (500 mL). Then the reaction mass was extracted with methylene chloride (600 m L) and the product containing organic layer was concentrated at below 45° C. to obtain residue. To the obtained residue was added water (120 mL) at 55° C. over a period of 30 min and stir for 1 hr at same temperature. To the reaction mass was added additional water (400 mL) at 55° C. over a period of 30 min and stir for 1 hr at same temperature. Reaction mass was allowed to cool to 20° C. and stir for 12 hrs at same temperature. The precipitated solid was filtered and washed with a mixture of N-methylpyrrolidone (40 mL) and water (160 mL), dried the solid in an oven under vacuum at 65° C. to obtain title compound. Yield: 90 g; Purity by HPLC: 97%; Diastereomer impurity: 2.7% by HPLC.

Example-24: Purification of Bictegravir

To a 500 mL round bottom flask fitted with a mechanical stirrer, thermometer was charged bictegravir (5 g; Diastereomer impurity: 2.7% by HPLC), methanol (100 mL) and methylene chloride (5 mL) at 25-30° C. and stir for 1 hr at same temperature. The insoluble material (Diastereomer impurity) was removed by filtration. Then the solvent was concentrated under vacuum and so-distilled with cyclohexane (10 mL). To the residue was added cyclohexane (15 mL) and stir for 1 hr. The precipitated solid was filtered and washed with cyclohexane (10 mL), dried the solid in an oven under vacuum at 50° C. to obtain title compound. Yield: 4 g; Purity by HPLC: 99.7%; Diastereomer impurity: 0.09% by HPLC.

Example-25: Purification of Bictegravir

To a 500 mL round bottom flask fitted with a mechanical stirrer, thermometer was charged bictegravir (50 g; Diastereomer impurity: 2.9% by HPLC), methanol (500 mL) and methylene chloride (250 mL) at 25-30° C. and stir for 1 hr at same temperature. The insoluble material (Diastereomer impurity) was removed by filtration. Then the solvent was concentrated under vacuum to obtain residue. The residue was co-distilled with methanol (100 mL) and then de-gas for 50-60 min, under vacuum at 50° C. to obtain title compound. Yield: 48.5 g; Purity by HPLC: 99.6%; Diastereomer impurity: 0.1% by HPLC.

Example-26: Purification of Bictegravir

To a 5 mL round bottom flask fitted with a mechanical stirrer, thermometer was charged bictegravir (200 mg; Diastereomer impurity: 2.5% by HPLC), tert-butanol (1 mL) at 25-30° C. and stir for 1 hr at same temperature. The insoluble material (Diastereomer impurity) was removed by filtration. Then the solvent was concentrated under vacuum and dried under vacuum, at ~50° C. to obtain title compound. Yield: 111 mg; Purity by HPLC: 99.7%; Diastereomer impurity: 0.12% by HPLC.

Example-27: Purification of Bictegravir

To a 500 mL round bottom flask fitted with a mechanical stirrer, thermometer was charged bictegravir (16 g; Diastereomer impurity: 2.1% by HPLC), ethyl acetate (400 mL) at 25-30° C. and stir for 1 hr at same temperature. The insoluble material (Diastereomer impurity) was removed by filtration. Then the solvent was concentrated under vacuum to obtain residue. The obtained residue was triturated with ethyl acetate (10 mL), for 1 hour. The precipitated material was filtered off, washed with ethyl acetate (5 mL) and dried under vacuum, at ~50° C. to obtain title compound. Yield: 8.5 g; Purity by HPLC: 99.8%; Diastereomer impurity: 0.1% by HPLC.

It will be understood that various modifications may be made to the embodiments disclosed herein. Therefore the above description should not be constructed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the specification appended hereto.

We claim:

1. A process for the preparation of bictegravir of Formula I:

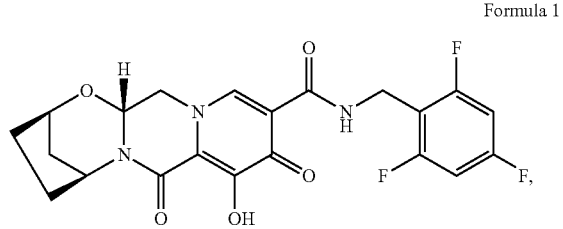 [SMILES: O=C(NCc1c(F)cc(F)cc1F)c1cn2c(c(O)c1=O)C(=O)N1[C@H]3CC[C@H](C3)O[C@@H]1C2]

Formula 1 comprising:
a) reacting a compound of Formula II with a compound of Formula III in the presence of at least one suitable activation agent and at least one suitable base in at least one suitable solvent to obtain a compound of Formula IV:

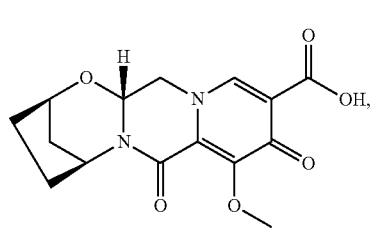

Formula II

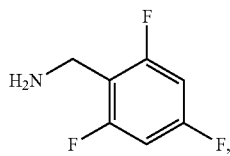

Formula III

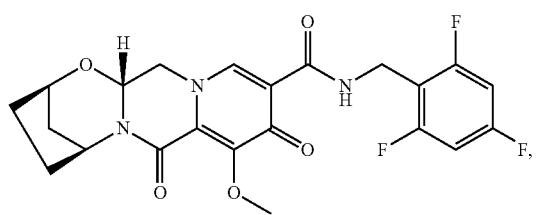

Formula IV and
b) demethylating the compound of Formula IV in the presence of at least one suitable deprotecting agent to obtain the bictegravir of Formula I;
wherein the at least one suitable activation agent in step a) is selected from the group consisting of 2-chloro-4, 6-dimethoxy-1,3,5-triazine, carbonyldiimidazole, 1-ethyl-3-(3-dimethyl amino propyl)carbodiimide hydrochloride, 1-hydroxybenzotriazole, 3-[bis(dimethylamino)methyliumyl]-3H-benzotriazol-1-oxide hexafluorophosphate, O-(1H-6-Chlorobenzotriazole-1-yl)-1,1,3,3-tetramethyluronium hexafluoro phosphate, O-(benzotriazol-1-yl)-N,N,N',N'-tetramethyluronium tetrafluoroborate, propyl phosphonic anhydride, dicyclohexylcarbodiimide, 3-hydroxytriazolo[4,5-b]pyridine, thionyl chloride, oxalyl chloride, phosphorus oxychloride, pivaloyl chloride, acetic anhydride, N-ethoxycarbonyl-2-ethoxy-1,2-dihydroquinoline, methanesulfonyl chloride and p-toluenesulfonyl chloride, and any combination thereof,
wherein the at least one suitable base is selected from the group consisting of sodium hydroxide, potassium hydroxide, sodium amide, sodium methoxide, sodium ethoxide, sodium t-butoxide, potassium t-butoxide, sodium carbonate, potassium carbonate, cesium carbonate, sodium bicarbonate, potassium bicarbonate, triethylamine, diisopropylamine, diisopropyl ethylamine, N-methyl piperidine, N-ethylpiperidine, and any combination thereof,
wherein the at least one suitable solvent is selected from the group consisting of acetone, methyl isobutyl ketone, methyl ethyl ketone, ethylacetate, isopropyl acetate, butyl acetate, acetonitrile, propionitrile, tetrahydrofuran, dimethyl ether, diisopropyl ether, methyl tertiary butyl ether, 1,4-dioxane, methylene chloride, ethylene chloride, chloroform, toluene, xylene, dimethylacetamide, dimethylformamide, dimethylsulfoxide, N-methylpyrrolidone, and any combination thereof, and wherein the at least one suitable deprotecting agent is selected from the group consisting of magnesium chloride, magnesium bromide, magnesium iodide, magnesium hydroxide, lithium chloride, lithium bromide, lithium iodide, lithium hydroxide, lithium trisiamyl borohydride, lithium triethyl borohydride, tri-sec-butyl borohydride, boron tribromide, aluminium chloride-triethylamine complex, aluminium chloride-N,N-dimethyl aniline complex, and any combination thereof.

2. The process as claimed in claim 1, further comprising purifying the isolated bictegravir of Formula I to reduce the content of diastereomeric impurities by:
   c) suspending or dissolving the bictegravir of Formula I obtained in step b) in at least one suitable solvent selected from the group consisting of an alcohol, an ester, a halogenated hydrocarbon, and any combination thereof,
   d) separating undissolved solids from the step c) suspension or solution, and
   e) isolating the purified bictegravir of Formula I.

3. The process as claimed in claim 2, wherein the at least one suitable solvent is selected from the group consisting of methanol, ethanol, isopropanol, n-propanol, tert-butanol, ethyl acetate, isopropyl acetate, isobutyl acetate, methylene chloride, ethylene chloride, and any combination thereof.

4. The process as claimed in claim 2, wherein step d) is carried out by filtration or decantation.

5. The process as claimed in claim 2, wherein the bictegravir of Formula I of step c) has a content of diastereomeric impurity of more than 0.15% by HPLC and the bictegravir of Formula I of step e) has a content of diastereomeric impurity of less than 0.15% by HPLC.

6. The process according to claim 1, further comprising forming a pharmaceutical composition by combining the bictegravir of Formula I obtained in step b), and at least one pharmaceutically acceptable excipient.

7. A crystalline bictegravir sodium Form-L characterized by X-Ray diffraction (XRD) pattern having one or more peaks at about 6.5, 9.1, 11.1, 11.3, 12.1, 12.9, 13.1, 14.0, 15.2, 15.6, 15.9, 16.5, 16.8, 17.2, 18.2, 18.8, 19.4, 19.9, 20.5, 21.1, 21.7, 22.6, 23.2, 24.3, 24.9, 25.6, 25.7, 26.5, 26.8, 27.4, 28.4, 29.6, 30.8, 31.4, 32.8, 34.5 and 35.1±0.2° 2θ.

8. A process for the preparation of bictegravir sodium Form-L, comprising:
   a) suspending or dissolving bictegravir in methylene chloride or trifluoroethanol at 25° C. to reflux temperature;
   b) optionally cooling the step a) reaction mass to below 25° C.;
   c) adding at least one sodium source to the step a) or step b) reaction mass or vice-versa, wherein
   the sodium source is selected from the group consisting of aqueous sodium hydroxide, an alcoholic sodium hydroxide, and a sodium alkoxide,
   the alcohol is selected from the group consisting of methanol, ethanol, butanol, isobutanol, propanol and isopropanol, and
   the sodium alkoxide is selected from the group consisting of sodium methoxide, sodium ethoxide, sodium butoxide and sodium pentoxide; and
   d) isolating the bictegravir sodium Form-L, wherein the isolated bictegravir sodium Form-L is characterized by an X-Ray diffraction (XRD) pattern having one or more peaks at about 6.5, 9.1, 11.1, 11.3, 12.1, 12.9, 13.1, 14.0, 15.2, 15.6, 15.9, 16.5, 16.8, 17.2, 18.2, 18.8, 19.4, 19.9, 20.5, 21.1, 21.7, 22.6, 23.2, 24.3, 24.9, 25.6, 25.7, 26.5, 26.8, 27.4, 28.4, 29.6, 30.8, 31.4, 32.8, 34.5 and 35.1±0.2° 2θ.

9. The process as claimed in claim 8, wherein the at least one sodium source is selected from the group consisting of methanolic sodium hydroxide, aqueous sodium hydroxide, and a combination thereof thereof.

10. A crystalline bictegravir sodium Form-L1 characterized by X-Ray diffraction (XRD) pattern having one or more peaks at about 5.6, 6.2, 7.7, 9.1, 11.3, 11.9, 12.6, 12.8, 13.9, 15.4, 16.2, 16.8, 17.0, 17.6, 18.4, 18.8, 18.9, 19.2, 19.8, 20.5, 20.7, 21.0, 21.5, 22.8, 23.8, 24.2, 24.5, 25.3, 25.7, 27.1, 28.4, 28.8, 29.5, 30.0, 30.9, 31.3, 31.8, 32.9, 33.4, 34.0, and 34.9±0.2° 2θ.

11. A process for the preparation of bictegravir sodium Form-L1, comprising:
   a) suspending or dissolving bictegravir in a mixture of isopentanol and acetonitrile at 25° C. to reflux temperature;
   b) optionally cooling the step a) reaction mass to below 25° C.;
   c) adding a sodium source to step a) or step b) reaction mass or vice-versa;
   wherein
   the sodium source is selected from the group consisting of aqueous sodium hydroxide, an alcoholic sodium hydroxide, and a sodium alkoxide, wherein
   the alcohol is selected from the group consisting of methanol, ethanol, butanol, isobutanol, propanol and isopropanol, and wherein
   the sodium alkoxide is selected from the group consisting of sodium methoxide, sodium ethoxide, sodium butoxide and sodium pentoxide, and
   d) isolating the bictegravir sodium Form-L1, wherein the isolated bictegravir sodium Form-L1 is characterized by an X-Ray diffraction (XRD) pattern having one or more peaks at about 5.6, 6.2, 7.7, 9.1, 11.3, 11.9, 12.6, 12.8, 13.9, 15.4, 16.2, 16.8, 17.0, 17.6, 18.4, 18.8, 18.9, 19.2, 19.8, 20.5, 20.7, 21.0, 21.5, 22.8, 23.8, 24.2, 24.5, 25.3, 25.7, 27.1, 28.4, 28.8, 29.5, 30.0, 30.9, 31.3, 31.8, 32.9, 33.4, 34.0, and 34.9±0.2° 2θ.

12. The process as claimed in claim 11, wherein the sodium source is aqueous sodium hydroxide.

13. A crystalline bictegravir sodium Form-L2 characterized by X-Ray diffraction (XRD) pattern having one or more peaks at about 6.5, 7.5, 8.3, 13.0, 14.4, 14.5, 15.4, 16.2, 16.7, 18.0, 18.6, 18.7, 19.4, 20.8, 20.9, 23.4, 24.0, 24.6, 26.3, 16.4, 30.0, 31.4, 32.8 and 35.3±0.2° 2θ.

14. A process for the preparation of bictegravir sodium Form-L2, comprising:
   heating bictegravir sodium Form-L1 at a temperature of about 35° C. to about 120° C.,
   wherein the bictegravir sodium Form-L1 characterized by X-Ray diffraction (XRD) pattern having one or more peaks at about 5.6, 6.2, 7.7, 9.1, 11.3, 11.9, 12.6, 12.8, 13.9, 15.4, 16.2, 16.8, 17.0, 17.6, 18.4, 18.8, 18.9, 19.2, 19.8, 20.5, 20.7, 21.0, 21.5, 22.8, 23.8, 24.2, 24.5, 25.3, 25.7, 27.1, 28.4, 28.8, 29.5, 30.0, 30.9, 31.3, 31.8, 32.9, 33.4, 34.0, and 34.9±0.2° 2θ.

15. A crystalline bictegravir sodium Form-L3 characterized by X-Ray diffraction (XRD) pattern having one or more peaks at about 5.9, 6.8, 8.5, 10.7, 11.7, 12.4, 13.2, 13.7, 15.4, 15.9, 16.6, 17.0, 17.5, 18.8, 19.6, 20.2, 20.6, 21.1, 21.5, 22.1, 22.9, 23.3, 24.1, 24.8, 25.6, 26.4, 28.6, 29.8, 30.7, 31.4, 32.9 and 34.1±0.2° 2θ.

16. A process for the preparation of bictegravir sodium Form-L3, comprising:
   a) suspending or dissolving bictegravir in n-butanol at 25° C. to reflux temperature;
   b) optionally cooling the step a) reaction mass to below 25° C.;
   c) adding a sodium source to step a) or step b) reaction mass or vice-versa,
wherein
   the sodium source is selected from the group consisting of aqueous sodium hydroxide, an alcoholic sodium hydroxide, and a sodium alkoxide,
   the alcohol is selected from the group consisting of methanol, ethanol, butanol, isobutanol, propanol and isopropanol, and
   the sodium alkoxide is selected from the group consisting of sodium methoxide, sodium ethoxide, sodium butoxide, and sodium pentoxide, and
   d) isolating the bictegravir sodium Form-L3, wherein the isolated bictegravir sodium Form-L3 is characterized by an X-Ray diffraction (XRD) pattern having one or more peaks at about 5.9, 6.8, 8.5, 10.7, 11.7, 12.4, 13.2, 13.7, 15.4, 15.9, 16.6, 17.0, 17.5, 18.8, 19.6, 20.2, 20.6, 21.1, 21.5, 22.1, 22.9, 23.3, 24.1, 24.8, 25.6, 26.4, 28.6, 29.8, 30.7, 31.4, 32.9 and 34.1±0.2° 2θ.

17. The process as claimed in claim 16, wherein the sodium source is aqueous sodium hydroxide.

18. A crystalline bictegravir sodium Form-L4 characterized by X-Ray diffraction (XRD) pattern having one or more peaks at about 5.6, 6.8, 8.4, 10.5, 11.3, 12.4, 12.9, 13.6, 15.0, 15.4, 16.6, 17.3, 18.1, 18.8, 19.5, 19.9, 20.5, 20.8, 21.3, 21.7, 22.6, 23.7, 24.0, 24.7, 25.0, 25.6, 25.8, 27.3, 28.0, 29.8, 30.5, 31.3, 32.4, 33.0, 34.2 and 35.0±0.2° 2θ.

19. A process for the preparation of bictegravir sodium Form-L4, comprising:
   a) suspending or dissolving bictegravir in n-pentanol at 25° C. to reflux temperature;
   b) optionally cooling the step a) reaction mass to below 25° C.; and
   c) adding a sodium source to step a) or step b) reaction mass or vice-versa,
wherein
   the sodium source is selected from the group consisting of aqueous sodium hydroxide, an alcoholic sodium hydroxide, and a sodium alkoxide,
   the alcohol is selected from the group consisting of methanol, ethanol, butanol, isobutanol, propanol and isopropanol, and
   the sodium alkoxide is selected from the group consisting of sodium methoxide, sodium ethoxide, sodium butoxide and sodium pentoxide, and
   d) isolating the bictegravir sodium Form-L4, wherein the isolated bictegravir sodium Form-L4 is characterized by an X-Ray diffraction (XRD) pattern having one or more peaks at about 5.6, 6.8, 8.4, 10.5, 11.3, 12.4, 12.9, 13.6, 15.0, 15.4, 16.6, 17.3, 18.1, 18.8, 19.5, 19.9, 20.5, 20.8, 21.3, 21.7, 22.6, 23.7, 24.0, 24.7, 25.0, 25.6, 25.8, 27.3, 28.0, 29.8, 30.5, 31.3, 32.4, 33.0, 34.2 and 35.0±0.2° 2θ.

20. The process as claimed in claim 19, wherein the sodium source is aqueous sodium hydroxide.

21. A crystalline bictegravir sodium Form-L5 characterized by X-Ray diffraction (XRD) pattern having one or more peaks at about 5.6, 6.4, 7.4, 8.4, 9.5, 10.2, 12.0, 12.9, 13.9, 14.4, 15.3, 16.1, 16.7, 18.0, 18.7, 19.4, 19.9, 20.7, 22.0, 22.4, 23.3, 24.0, 24.6, 25.7, 26.3, 28.5, 29.4, 29.9, 31.3, 31.8 and 32.6±0.2° 2θ.

22. A process for the preparation of bictegravir sodium Form-L5, comprising:
   a) suspending or dissolving bictegravir in n-propanol at 25° C. to reflux temperature;
   b) optionally cooling the step a) reaction mass to below 25° C.; and
   c) adding a sodium source to step a) or step b) reaction mass or vice-versa,
wherein
   the sodium source is selected from the group consisting of aqueous sodium hydroxide, an alcoholic sodium hydroxide, and a sodium alkoxide,
   the alcohol is selected from the group consisting of methanol, ethanol, butanol, isobutanol, propanol and isopropanol, and
   the sodium alkoxide is selected from the group consisting of sodium methoxide, sodium ethoxide, sodium butoxide and sodium pentoxide, and
   d) isolating the bictegravir sodium Form-L5, wherein the isolated bictegravir sodium Form-L5 is characterized by an X-Ray diffraction (XRD) pattern having one or more peaks at about 5.6, 6.4, 7.4, 8.4, 9.5, 10.2, 12.0, 12.9, 13.9, 14.4, 15.3, 16.1, 16.7, 18.0, 18.7, 19.4, 19.9, 20.7, 22.0, 22.4, 23.3, 24.0, 24.6, 25.7, 26.3, 28.5, 29.4, 29.9, 31.3, 31.8 and 32.6±0.2° 2θ.

23. The process as claimed in claim 22, wherein the sodium source is aqueous sodium hydroxide.

24. A crystalline bictegravir sodium Form-L6 characterized by X-Ray diffraction (XRD) pattern having one or more peaks at about 5.6, 6.5, 7.5, 8.3, 9.6, 10.3, 12.0, 12.9, 14.0, 14.5, 15.3, 16.2, 16.7, 17.7, 18.0, 18.7, 19.4, 19.9, 20.8, 20.9, 22.5, 23.4, 24.0, 24.6, 26.3, 27.0, 29.4, 30.0, 31.3, 32.8 and 34.5±0.2° 2θ.

25. A process for preparation of bictegravir sodium Form-L6, comprising:
   a) suspending or dissolving bictegravir in isobutanol at 25° C. to reflux temperature,
   b) optionally cooling the step a) reaction mass to below 25° C., and
   c) adding a sodium source to step a) or step b) reaction mass or vice-versa,
wherein
   the sodium source is selected from the group consisting of aqueous sodium hydroxide, an alcoholic sodium hydroxide, and a sodium alkoxide, wherein
   the alcohol is selected from the group consisting of methanol, ethanol, butanol, isobutanol, propanol and isopropanol, and
   the sodium alkoxide is selected from the group consisting of sodium methoxide, sodium ethoxide, sodium butoxide and sodium pentoxide, and
   d) isolating the bictegravir sodium Form-L6, wherein the isolated bictegravir sodium Form-L6 is characterized by an X-Ray diffraction (XRD) pattern having one or more peaks at about 5.6, 6.5, 7.5, 8.3, 9.6, 10.3, 12.0, 12.9, 14.0, 14.5, 15.3, 16.2, 16.7, 17.7, 18.0, 18.7, 19.4, 19.9, 20.8, 20.9, 22.5, 23.4, 24.0, 24.6, 26.3, 27.0, 29.4, 30.0, 31.3, 32.8 and 34.5±0.2° 2θ.

26. The process as claimed in claim 25, wherein the sodium source is aqueous sodium hydroxide.

27. A pharmaceutical composition comprising:
   bictegravir, or a pharmaceutically acceptable salt, co-crystal, solvate or hydrate thereof; and
   at least one pharmaceutically acceptable excipient, wherein the bictegravir is one of:

crystalline bictegravir sodium Form-L characterized by X-Ray diffraction (XRD) pattern having one or more peaks at about 6.5, 9.1, 11.1, 11.3, 12.1, 12.9, 13.1, 14.0, 15.2, 15.6, 15.9, 16.5, 16.8, 17.2, 18.2, 18.8, 19.4, 19.9, 20.5, 21.1, 21.7, 22.6, 23.2, 24.3, 24.9, 25.6, 25.7, 26.5, 26.8, 27.4, 28.4, 29.6, 30.8, 31.4, 32.8, 34.5 and 35.1±0.2° 2θ, crystalline bictegravir sodium Form-L1 characterized by X-Ray diffraction (XRD) pattern having one or more peaks at about 5.6, 6.2, 7.7, 9.1, 11.3, 11.9, 12.6, 12.8, 13.9, 15.4, 16.2, 16.8, 17.0, 17.6, 18.4, 18.8, 18.9, 19.2, 19.8, 20.5, 20.7, 21.0, 21.5, 22.8, 23.8, 24.2, 24.5, 25.3, 25.7, 27.1, 28.4, 28.8, 29.5, 30.0, 30.9, 31.3, 31.8, 32.9, 33.4, 34.0, and 34.9±0.2° 2θ, crystalline bictegravir sodium Form-L2 characterized by X-Ray diffraction (XRD) pattern having one or more peaks at about 6.5, 7.5, 8.3, 13.0, 14.4, 14.5, 15.4, 16.2, 16.7, 18.0, 18.6, 18.7, 19.4, 20.8, 20.9, 23.4, 24.0, 24.6, 26.3, 29.4, 30.0, 31.4, 32.8 and 35.3±0.2° 2θ, crystalline bictegravir sodium Form-L3 characterized by X-Ray diffraction (XRD) pattern having one or more peaks at about 5.9, 6.8, 8.5, 10.7, 11.7, 12.4, 13.2, 13.7, 15.4, 15.9, 16.6, 17.0, 17.5, 18.8, 19.6, 20.2, 20.6, 21.1, 21.5, 22.1, 22.9, 23.3, 24.1, 24.8, 25.6, 26.4, 28.6, 29.8, 30.7, 31.4, 32.9 and 34.1±0.2° 2θ, crystalline bictegravir sodium Form-L4 characterized by X-Ray diffraction (XRD) pattern having one or more peaks at about 5.6, 6.8, 8.4, 10.5, 11.3, 12.4, 12.9, 13.6, 15.0, 15.4, 16.6, 17.3, 18.1, 18.8, 19.5, 19.9, 20.5, 20.8, 21.3, 21.7, 22.6, 23.7, 24.0, 24.7, 25.0, 25.6, 25.8, 27.3, 28.0, 29.8, 30.5, 31.3, 32.4, 33.0, 34.2 and 35.0±0.2° 2θ, crystalline bictegravir sodium Form-L5 characterized by X-Ray diffraction (XRD) pattern having one or more peaks at about 5.6, 6.4, 7.4, 8.4, 9.5, 10.2, 12.0, 12.9, 13.9, 14.4, 15.3, 16.1, 16.7, 18.0, 18.7, 19.4, 19.9, 20.7, 22.0, 22.4, 23.3, 24.0, 24.6, 25.7, 26.3, 28.5, 29.4, 29.9, 31.3, 31.8 and 32.6±0.2° 2θ, and crystalline bictegravir sodium Form-L6 characterized by X-Ray diffraction (XRD) pattern having one or more peaks at about 5.6, 6.5, 7.5, 8.3, 9.6, 10.3, 12.0, 12.9, 14.0, 14.5, 15.3, 16.2, 16.7, 17.7, 18.0, 18.7, 19.4, 19.9, 20.8, 20.9, 22.5, 23.4, 24.0, 24.6, 26.3, 27.0, 29.4, 30.0, 31.3, 32.8 and 34.5±0.2° 2θ.

* * * * *